United States Patent [19]

Takahira et al.

[11] Patent Number: 5,664,157
[45] Date of Patent: Sep. 2, 1997

[54] NONCONTACT IC CARD INTERFACE UNIT AND COMMUNICATION SYSTEM USING THE INTERFACE UNIT

[75] Inventors: Kenichi Takahira; Koichi Hayamizu, both of Itami, Japan

[73] Assignee: Mitsubishi Denki Kabushiki Kaisha, Tokyo, Japan

[21] Appl. No.: 413,959

[22] Filed: Mar. 30, 1995

[30] Foreign Application Priority Data

Apr. 8, 1994 [JP] Japan ................ 6-070913

[51] Int. Cl.[6] ........................ G06K 19/06
[52] U.S. Cl. ............... 395/500; 235/491; 235/492; 235/493; 235/380
[58] Field of Search ............... 235/491, 492, 235/493, 380; 395/500

[56] References Cited

U.S. PATENT DOCUMENTS

| 4,727,244 | 2/1988 | Nakano et al. | 235/380 |
|---|---|---|---|
| 4,798,322 | 1/1989 | Bernstein et al. | 235/487 |
| 4,924,171 | 5/1990 | Baba et al. | 323/347 |
| 4,960,983 | 10/1990 | Inoue | 235/449 |
| 5,012,489 | 4/1991 | Burton et al. | 375/222 |
| 5,019,970 | 5/1991 | Yamaguchi et al. | 364/200 |
| 5,113,184 | 5/1992 | Katayama | 340/825.54 |
| 5,157,247 | 10/1992 | Takahira | 235/492 |
| 5,220,158 | 6/1993 | Takahira et al. | 235/492 |
| 5,282,247 | 1/1994 | McClean et al. | 380/4 |
| 5,296,692 | 3/1994 | Shino | 235/486 |
| 5,326,965 | 7/1994 | Inoue | 235/492 |
| 5,337,063 | 8/1994 | Takahira | 343/741 |
| 5,353,434 | 10/1994 | Katayama | 395/550 |
| 5,362,954 | 11/1994 | Komatsu | 235/492 |
| 5,396,056 | 3/1995 | Yamaguchi | 235/492 |
| 5,418,353 | 5/1995 | Katayama et al. | 235/380 |
| 5,432,328 | 7/1995 | Yamaguchi | 235/449 |
| 5,444,222 | 8/1995 | Inoue | 235/380 |

Primary Examiner—Huin J. Tesha
Assistant Examiner—Nicole Dehlitsch-Moats
Attorney, Agent, or Firm—Leydig, Voit & Mayer

[57] ABSTRACT

An interface unit includes an interface controller for controlling a bidirectional signal relative to an external host computer, a communication controller for controlling data communication with a noncontact IC card according to an output signal sent from the host computer, and a memory accessible by both the interface controller and communication controller. A noncontact IC card is very useful because of its accessibility at a remote place. A connector of the noncontact IC card can be protected from mechanical damage. With the interface unit, the noncontact IC card can be accessed as quickly as a contact IC card is.

16 Claims, 23 Drawing Sheets

FIG. 3

| PIN | MEMORY CARD SIGNAL | I/O | I/O CARD SIGNAL | I/O | PIN | MEMORY CARD SIGNAL | I/O | I/O CARD SIGNAL | I/O |
|---|---|---|---|---|---|---|---|---|---|
| 1 | GND | | GND | | 35 | GND | | GND | |
| 2 | D3 | I/O | D3 | I/O | 36 | -CD1 | O | -CD1 | O |
| 3 | D4 | I/O | D4 | I/O | 37 | D11 | I/O | D11 | I/O |
| 4 | D5 | I/O | D5 | I/O | 38 | D12 | I/O | D12 | I/O |
| 5 | D6 | I/O | D6 | I/O | 39 | D13 | I/O | D13 | I/O |
| 6 | D7 | I/O | D7 | I/O | 40 | D14 | I/O | D14 | I/O |
| 7 | -CE1 | I | -CE1 | I | 41 | D15 | I/O | D15 | I/O |
| 8 | A10 | I | A10 | I | 42 | -CE2 | I | -CE2 | I |
| 9 | -OE | I | -OE | I | 43 | RFSH | I | RFSH | I |
| 10 | A11 | I | A11 | I | 44 | RFU | | -IORD | I |
| 11 | A9 | I | A9 | I | 45 | RFU | | -IOWR | I |
| 12 | A8 | I | A8 | I | 46 | A17 | I | A17 | I |
| 13 | A13 | I | A13 | I | 47 | A18 | I | A18 | I |
| 14 | A14 | I | A14 | I | 48 | A19 | I | A19 | I |
| 15 | -WE/-PGM | I | -WE/-PGM | I | 49 | A20 | I | A20 | I |
| 16 | +RDY/-BSY | O | IREQ | O | 50 | A21 | I | A21 | I |
| 17 | VCC | | VCC | | 51 | VCC | | VCC | |
| 18 | VPP1 | | VPP1 | | 52 | VPP2 | | VPP2 | |
| 19 | A16 | I | A16 | I | 53 | A22 | I | A22 | I |
| 20 | A15 | I | A15 | I | 54 | A23 | I | A23 | I |
| 21 | A12 | I | A12 | I | 55 | A24 | I | A24 | I |
| 22 | A7 | I | A7 | I | 56 | A25 | I | A25 | I |
| 23 | A6 | I | A6 | I | 57 | RFU | | RFU | |
| 24 | A5 | I | A5 | I | 58 | +RESET | I | +RESET | I |
| 25 | A4 | I | A4 | I | 59 | -WAIT | O | -WAIT | O |
| 26 | A3 | I | A3 | I | 60 | RFU | | -INPACK | O |
| 27 | A2 | I | A2 | I | 61 | -REG | I | -REG | I |
| 28 | A1 | I | A1 | I | 62 | BVD2 | O | -SPKR | O |
| 29 | A0 | I | A0 | I | 63 | BVD1 | O | -STSCHG | O |
| 30 | D0 | I/O | D0 | I/O | 64 | D8 | I/O | D8 | I/O |
| 31 | D1 | I/O | D1 | I/O | 65 | D9 | I/O | D9 | I/O |
| 32 | D2 | I/O | D2 | I/O | 66 | D10 | I/O | D10 | I/O |
| 33 | +WP | O | -IOIS16 | O | 67 | -CD2 | O | -CD2 | O |
| 34 | GND | | GND | | 68 | GND | | GND | |

COMMAND CODE TABLE

|            | b7 | b6 | b5 | b4 | b3 | b2 | b1 | b0 |
|------------|----|----|----|----|----|----|----|----|
| READ       | ×  | ×  | ×  | ×  | 0  | 0  | 0  | 1  |
| WRITE      | ×  | ×  | ×  | ×  | 0  | 0  | 1  | 0  |
| ID READ    | 0  | 0  | 0  | 1  | ×  | ×  | ×  | ×  |
| ID SEND    | 0  | 0  | 1  | 0  | ×  | ×  | ×  | ×  |
| ID COMPARE | 0  | 1  | 0  | 0  | ×  | ×  | ×  | ×  |
| ID RESET   | 1  | 1  | 1  | 1  | ×  | ×  | ×  | ×  |

× : DON'T CARE

STATUS CODE TABLE

| b7 | b6 | b5 | b4 | b3 | b2 | b1 | b0 |

+RDY/-BSY ── (b7)
ID CODE SET OR NOT ── (b6)

TIMER OVER ── (b3)
ID CODE ERROR ── (b2)
COMMUNICATION ERROR ── (b1)
MEMORY HARDWARE ERROR ── (b0)

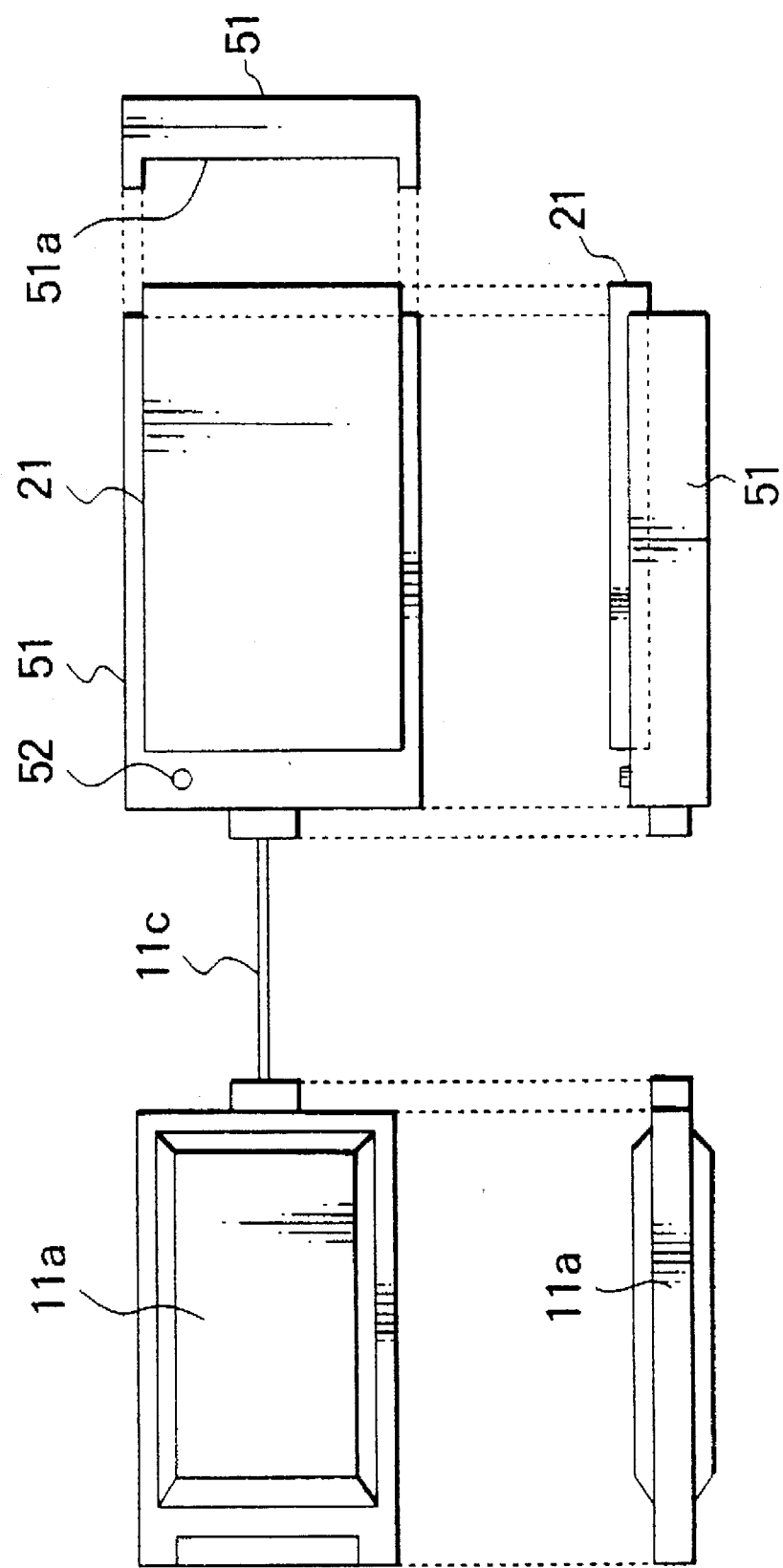

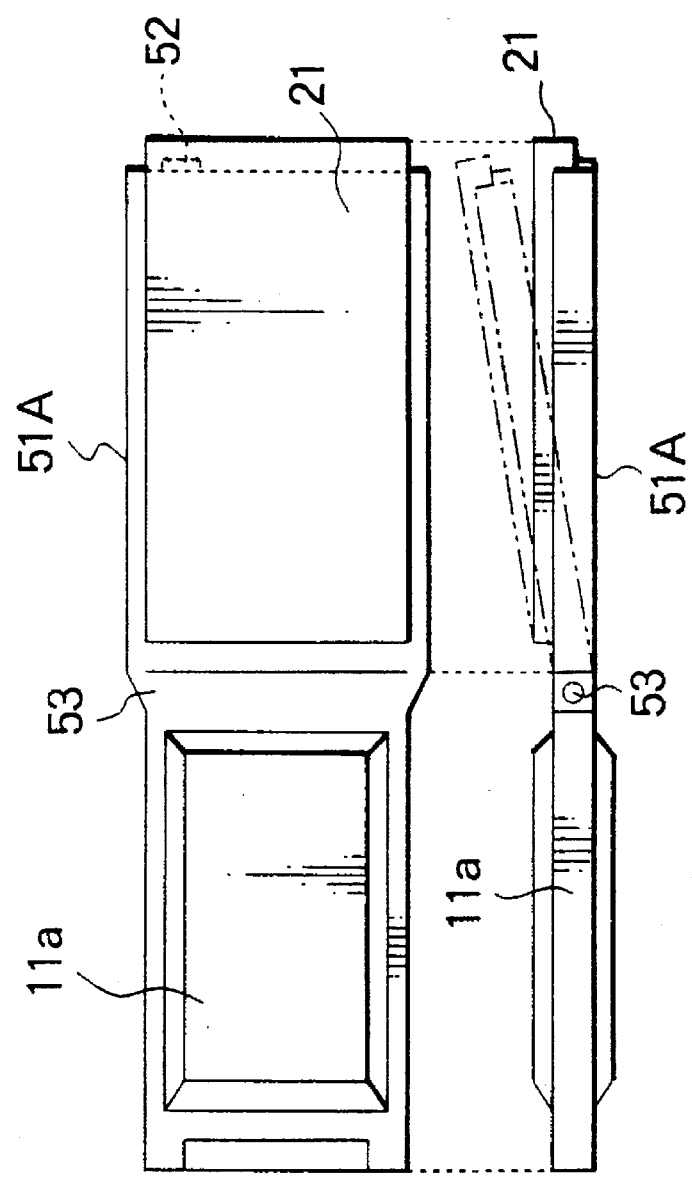

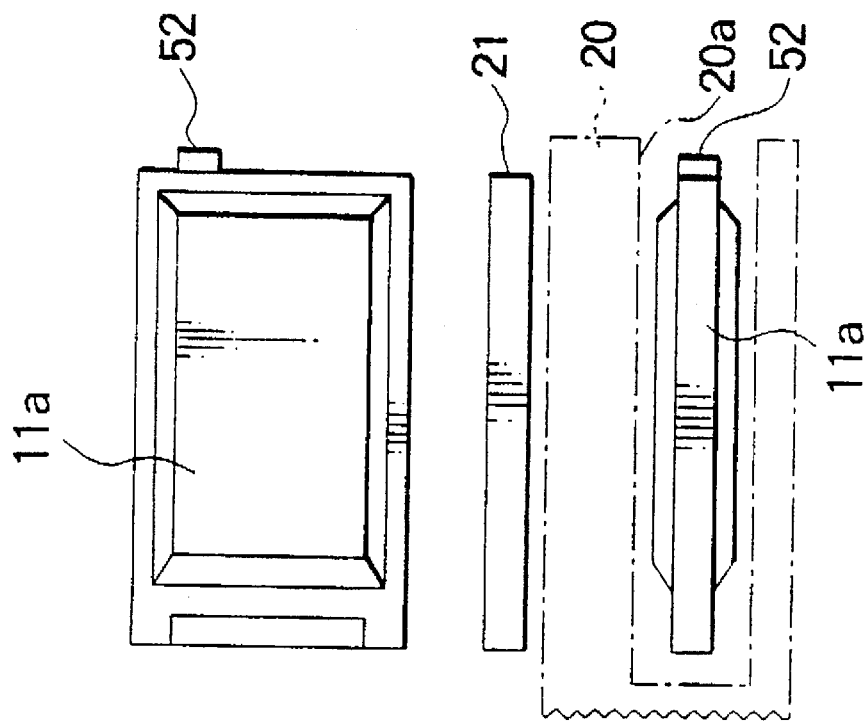

NONCONTACT IC CARD INTERFACE UNIT AND COMMUNICATION SYSTEM USING THE INTERFACE UNIT

BACKGROUND OF THE INVENTION

1. Field of the Invention

The present invention relates to a noncontact IC card interface unit for communication with a noncontact IC card.

2. Description of the Related Art

In recent years, noncontact IC cards have been developed and put to use. The advantages of the noncontact IC card lie in that (1) it is useful because it need not be loaded in a reader writer and is accessible at a remote place, and that (2) it is not prone to a malfunction due to imperfect contact or a failure due to static electricity, because it does not require any electrodes unlike any known contact IC card.

FIG. 23 is a schematic block diagram showing a communication system for data communication with a known noncontact IC card 1. As shown in FIG. 23, an interface unit 4 such as a reader/writer is electrically coupled with a host computer 2 by means of a serial able 3 such as one conformable to RS-232C. The interface unit 4 consists of a controller 4a that includes an MCU and that controls bidirectional data transfered between the noncontact IC card 1 and host computer 2 by generating a control signal for use in controlling internal elements of the interface unit 4 in response to a memory access signal sent from the host computer 2, a transmitter-/receiver 4b including a modulator/demodulator, and an antenna 4c for transmitting or receiving a transmission or reception signal 5 transferred to or from the noncontact IC card 1. The antenna 4c is not incorporated in the body of the interface unit 4 but is electrically connected with the transmitter/receiver 4b externally of the body. The transmitter/receiver 4b modulates transmission data sent from the controller 4a so as to produce a transmission signal to be sent to the noncontact IC card 1 via the antenna 4c, or demodulates a reception signal sent from the noncontact IC card 1 via the antenna 4c so as to convert it into digital data.

In the above communication system having the foregoing configuration, the interface nit 4 serves as a mere repeater for facilitating communication between the host computer 2 and noncontact IC card 1. The interface unit 4 does not retain data read from the noncontact IC card 1 via the antenna 4c but merely transfers the data consecutively to the host computer 2. Since the transmission rate of data transfer between the noncontact IC card 1 and antenna 4c is usually low (approximately 19.2 bps at highest), the transmission rate of data transfer between the host computer 2 and interface unit 4 need not be very high. The serial cable 3 is therefore used to connect the host computer 2 to the interface unit 4. This poses a problem in that the memory in the known noncontact IC card cannot be accessed (read or written) at a high speed unlike the one in a known contact IC card.

The employment of the known contact IC card guarantees quick access. When an attempt is made to acquire data from the IC card through another host computer, the IC card must be ejected from a currently-used host computer. At the time of inserting and ejecting an IC card, force is applied to a connector of the IC card. This results in mechanical damage or imperfect contact.

SUMMARY OF THE INVENTION

The present invention attempts to solve the aforesaid problems. An object of the present invention is to provide an interface unit which makes the most of the aforesaid advantages of noncontact IC cards, i.e., that the noncontact IC card is accessible at a remote place and that the connector of the noncontact IC card can be protected from mechanical damage, and which makes it possible to access the noncontact IC card as quickly as accessing a contact IC card, and to provide a communication system using the interface unit.

In recent years, contact IC cards have been widely adopted as extension memories for host computers. A machine made by mounting an IC card slot in a host computer, such as a notebook-sized portable computer, has gained popularity. Driver software and other application software for use in utilizing the contact IC card as a data storage medium have been developed in earnest. Another object of the present invention is to provide an interface unit that can be mounted in a slot for contact IC cards and that enables running of driver software and other application software which are designed for the contact IC card, and to provide a communication system using the interface unit.

In consideration of the foregoing objects, according to the first aspect of the present invention, there is provided a noncontact IC card interface unit for communication between an external host computer and a noncontact IC card and comprising a connector for use in connecting the interface unit to an external host, a first control means electrically connected to the connector for controlling a bidirectional signal relative to the external host, a second control means connected to the first control means for receiving an output signal from the external host computer via the first control means so as to control data communication with a noncontact IC card according to the output signal received from the external host computer, an electromagnetic-wave signal communicating means electrically connected to the second control means and designed to transmit or receive a bidirectional electromagnetic-wave signal relative to the noncontact IC card, and a memory which is electrically connected to the first control means and second control means and which is accessible (data can be read or written) by the first control means and second control means.

According to the second aspect of the present invention, there is provided a noncontact IC card interface unit further comprising a mode selector means for changing a normal mode in which the noncontact IC card is accessed via the electromagnetic-wave signal communicating means into a charge mode in which a secondary battery incorporated in the noncontact IC card is charged through the electromagnetic-wave signal communicating means, or vice versa.

According to the third aspect of the present invention, there is provided a noncontact IC card interface unit in which the mode selector means is a frequency changer means for changing the frequency of an electromagnetic-wave signal to be sent from the electromagnetic-wave signal communicating means to the noncontact IC card between the normal mode and charge mode.

According to the fourth aspect of the present invention, there is provided a noncontact IC card interface unit in which the connector is interchangeable with a connector of an IC card having standard external dimensions in terms of shape and electrical specifications.

According to the fifth aspect of the present invention, there is provided a noncontact IC card interface unit in which the electromagnetic-wave signal communicating means has a housing, and a noncontact IC card mounting portion in which a noncontact IC card is closely mounted is formed in the housing of the electromagnetic-wave signal communicating means.

According to the sixth aspect of the present invention, there is provided a noncontact IC card interface unit comprising a body containing a connector, a first control means, a second control means, and a memory, and an antenna having an electromagnetic-wave signal communicating means. The antenna is integrated into the body in such a manner that it can pivot freely.

According to the seventh aspect of the present invention, there is provided a noncontact IC card interface unit having a housing into which a connector, a first control means, a second control means, a memory, and an electromagnetic-wave signal communicating means are integrated.

According to the eight aspect of the present invention, there is provided a communication system for communication between a host computer and a noncontact IC card and comprising a noncontact IC card having a memory, a host computer for supplying an output signal for use in accessing the memory of the noncontact IC card, and a noncontact IC card interface unit for receiving an output signal from the host computer so as to enable data communication between the host computer and noncontact IC card. The noncontact IC card interface unit comprises a connector for use in connecting the interface unit to the host computer, a first control means electrically connected to the connector and designed to control a bidirectional signal relative to the host computer, a second control means connected to the first control means and designed to receive an output signal from the host computer via the first control means so as to control data communication with the noncontact IC card according to the output signal, an electromagnetic-wave signal communicating means electrically connected to the second control means for transmitting and receiving a bidirectional electromagnetic-wave signal relative to the noncontact IC card, and a memory electrically connected to the first control means and second control means and accessible by the first control means and second control means.

According to the ninth aspect of the present invention, there is provided a communication system in which the noncontact IC card interface unit has an interface mode selector means for changing a normal mode in which a memory in the noncontact IC card is accessed via the electromagnetic-wave signal communicating means to or from a charge mode in which a secondary battery incorporated in the noncontact IC card is charged through the electromagnetic-wave signal communicating means.

According to the tenth aspect of the present invention, there is provided a communication system in which the interface mode selector means in the noncontact IC card interface unit is a frequency changer means for changing the frequency of an electromagnetic-wave signal to be sent from the electromagnetic-wave signal communicating means to the noncontact IC card between the normal and charge modes.

According to the eleventh aspect of the present invention, there is provided a communication system in which the noncontact IC card has a card mode changer means for changing a normal mode in which the noncontact IC card is accessed by the noncontact IC card interface unit to or from a charge mode in which a secondary battery incorporated in the noncontact IC card is charged.

According to the twelfth aspect of the present invention, the card mode changer means in the noncontact IC card is a frequency changer means for changing the frequency of an electromagnetic-wave signal received from the electromagnetic-wave signal communicating means in the interface unit between the normal mode and charge mode.

According to the thirteenth aspect of the present invention, the card mode changer means in the noncontact IC card is a cutoff means for cutting off an activation signal intended to activate the noncontact IC card and fed from the host computer via the noncontact IC card interface unit.

According to the fourteenth aspect of the present invention, there is provided a communication system in which: a noncontact IC card interface unit has a housing into which a connector, a first control means, a second control means, a memory, and an electromagnetic-wave signal communicating means are integrated; a host computer has a host connector; an interface unit mounting portion in which the housing of the noncontact IC card interface unit is mounted in the host connector; and a noncontact IC card mounting portion in which the noncontact IC card is mounted so that the noncontact IC card lies substantially parallel to the noncontact IC card interface unit at an outer surface of the host computer connector.

According to the fifteenth aspect of the present invention, there is provided a communication system in which: a memory in a noncontact IC card interface unit is segmented into a plurality of blocks each having a predetermined length in bytes; a memory in a noncontact IC card has a larger storage capacity than the one in the noncontact IC card interface unit and is segmented into a plurality of blocks each having the same length as each of the blocks of the memory in the noncontact IC card interface unit; data transfer is performed block by block between the memory in the noncontact IC card interface and the one in the noncontact IC card the noncontact IC card interface unit has a tag memory for storing addresses of blocks whose data has been transferred from the memory in the noncontact IC card to the one in the noncontact IC card interface unit.

In the noncontact IC card interface unit and communication system which are configured as described above according to the first and eighth aspects, there are provided the first control means for controlling a bidirectional signal relative to the external host computer, the second control means for controlling data communication with the noncontact IC card according to an output signal of the external host computer, and the memory accessible by the first and second control means. For reading data from the noncontact IC card, first, the second control means transfers data fetched from the noncontact IC card to the memory according to the output signal sent from the host computer. The host computer then quickly accesses the data transferred to the memory through the first control means. For writing data in the noncontact IC card, the host computer quickly writes data in the memory through the first control means. The second control means then transmits the data written in the memory to the noncontact IC card and writes it in the noncontact IC card.

According to the second, ninth, and eleventh aspects, the normal mode in which the memory in the noncontact IC card is accessed can be changed to or from the charge mode in which the secondary battery in the noncontact IC card is charged, or vice versa. Therefore, the noncontact IC card is not activated accidentally during charging.

According to the third, tenth, and twelfth aspects, in the noncontact IC card interface unit or noncontact IC card, the frequency of an electromagnetic wave is changed between the charge mode and normal mode. The noncontact IC card can therefore be charged efficiently and not activated accidentally during charging.

According to the thirteenth aspect, the noncontact IC card includes the cutoff means for cutting off an activation signal, which is intended to activate the noncontact IC card, during charging. During charging of the noncontact IC card, the noncontact IC card is not activated accidentally.

According to the fourth aspect, the noncontact IC card interface unit can be mounted in the host connector designed for a conventional contact IC card and located in the external host computer. Driver software and other application software designed for the contact IC card can be run.

According to the fifth aspect, the noncontact IC card is locked in the electromagnetic-wave signal communicating means for transmitting and receiving a bidirectional electromagnetic-wave signal relative to the noncontact IC card. Communication with the noncontact IC card becomes more stable, and communication reliability improves.

According to the sixth aspect, the antenna can pivot freely with respect to the body. The angle of the antenna can be determined freely.

According to the seventh an fourteenth aspects, the noncontact IC card interface unit is realized as an integrated unit. The noncontact IC card interface unit may therefore be designed compactly. The noncontact IC card interface unit is inserted and mounted in the host connector, and the noncontact IC card is locked in the outer surface of the host connector. Stable communication ensues.

According to the fifteenth aspect, each of the memories in the noncontact IC card interface unit and noncontact IC card is segmented into blocks each having the same length in bytes. Data in the memory is transferred block by block. A tag memory is used to manage addresses of blocks whose data has been transferred. Large-capacity noncontact IC cards can therefore be dealt with and accessed relatively quickly.

BRIEF DESCRIPTION OF THE DRAWINGS

FIG. 3 shows an example of pin assignments defined for an interface connector of the interface unit in FIG. 1;

FIG. 20D is a reference view showing relations between FIGS. 20A, 20B and 20C;

FIGS. 21a and 21b are top and side views showing an interface unit in accordance with the fifth embodiment;

FIGS. 22a and 22b are top and side views showing an interface unit in accordance with the sixth embodiment.

DETAILED DESCRIPTION OF THE PREFERRED EMBODIMENTS

First Embodiment

Figure 1:
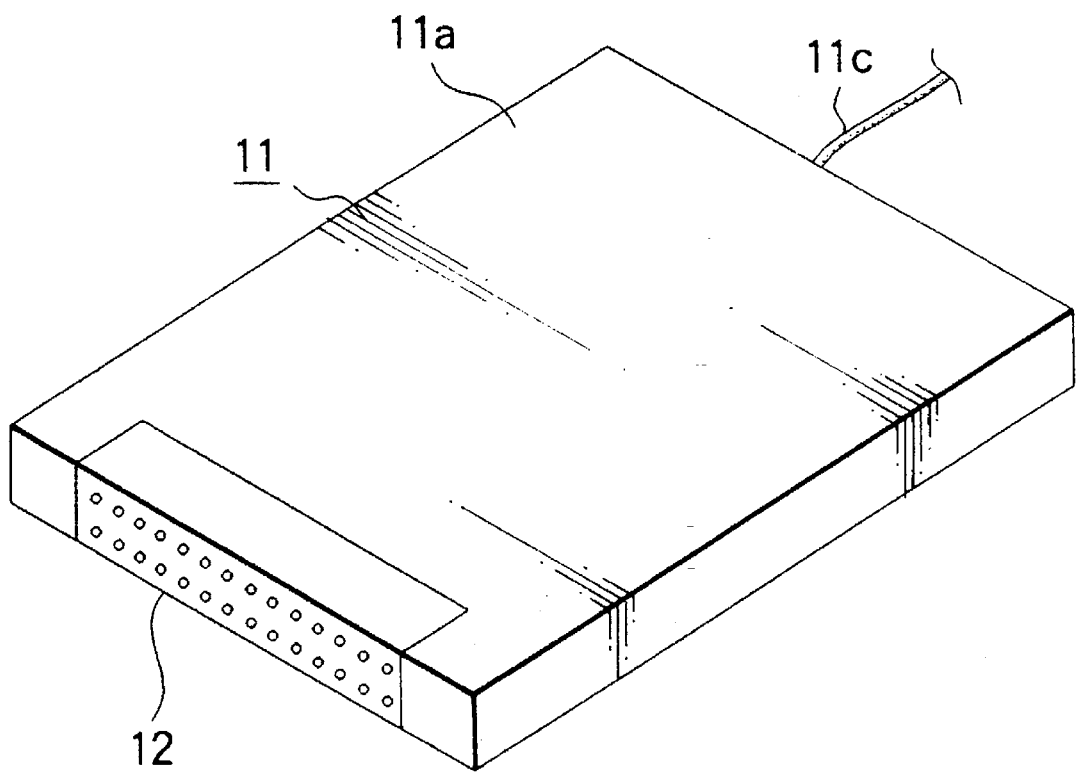
FIG. 1 is a perspective view showing an interface unit in accordance with the first embodiment.
Figure 2:
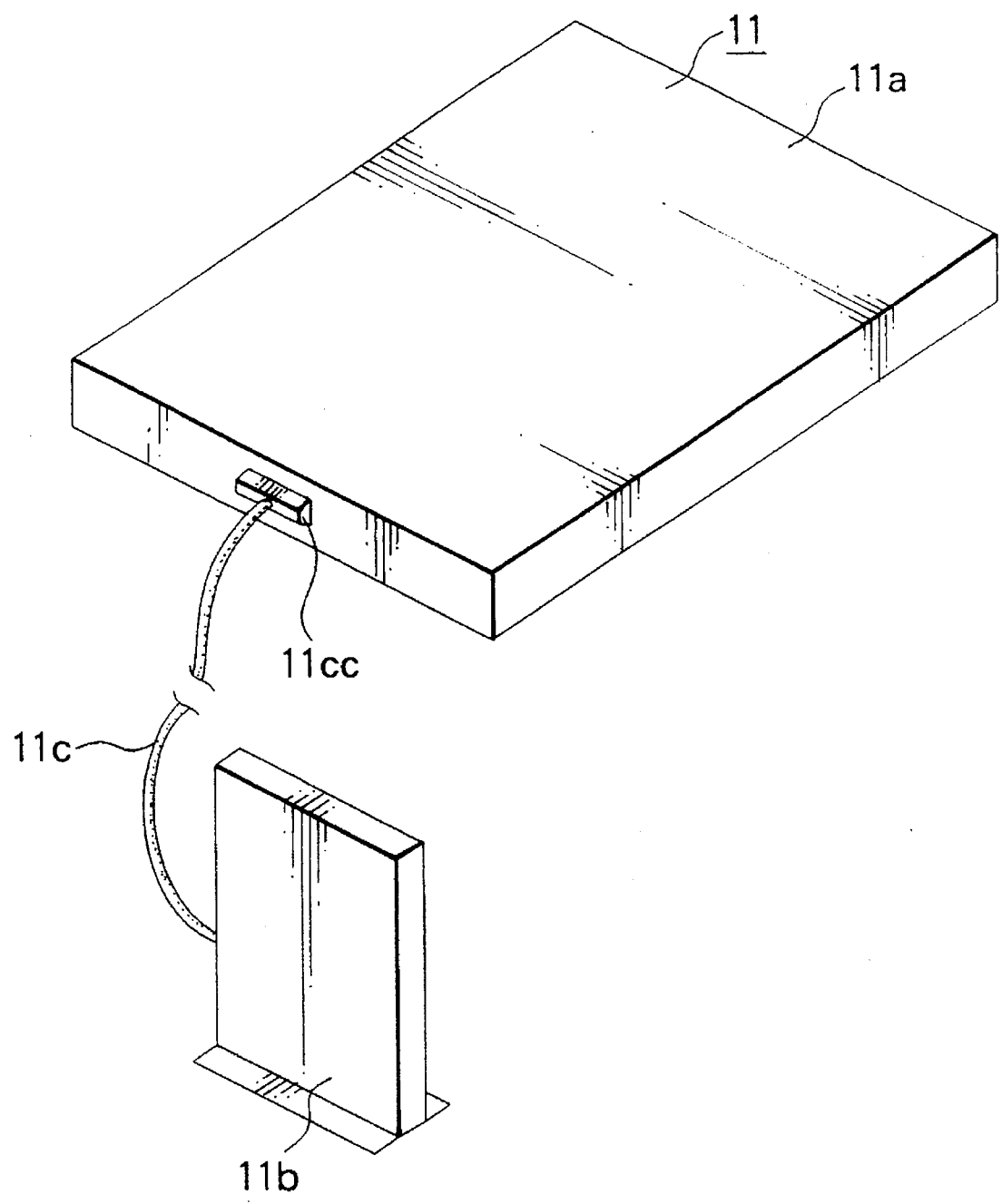
FIG. 2 is a perspective view showing the opposite side of the interlace unit in FIG.

FIG. 1 is a perspective view showing a body of an interface unit of the present invention designed for a noncontact IC card. FIG. 2 is a perspective view showing the opposite side of the body of the interface unit of FIG. 1. An interface unit 11 is, as shown in FIG. 2, composed of a body 11a, an antenna 11b, and an antenna cable 11c for electrically connecting the body 11a to the antenna 11b. The antenna cable 11c is, as shown in FIG. 2, electrically coupled with the body 11a by means of a splicer connector 11cc.

The body 11a of the interface unit 11 has, as shown in FIGS. 1 and 2, substantially the same shape as a known contact IC card that has standard external dimensions (that is, 54 by 85.6 by 3.3 mm). An interface connector 12 is integrated into the body 11a along a short side of the body 11a. The interface connector 12 is a connector for use in connecting a host computer 20 (See FIG. 4) to the interface unit 11. The interface connector 12 is interchangeable with a connector of a known contact IC card in terms of pin assignments, electrical specifications, and shape. The interface connector 12 can therefore be mounted in an IC card slot serving as a host connector in a known host computer. Driver software and other application software designed for a known contact IC card can be run. FIG. 3 shows an example of pin assignments defined for the interface connector 12. According to the example shown in FIG. 3, a 68-pin connector (a connector having two 34-pin rows) conformable to either the specifications for a memory card or for an I/O card can be employed. Description on this embodiment will proceed on the assumption that the interface unit 11 operates under the specifications for a memory card.

Figure 4:
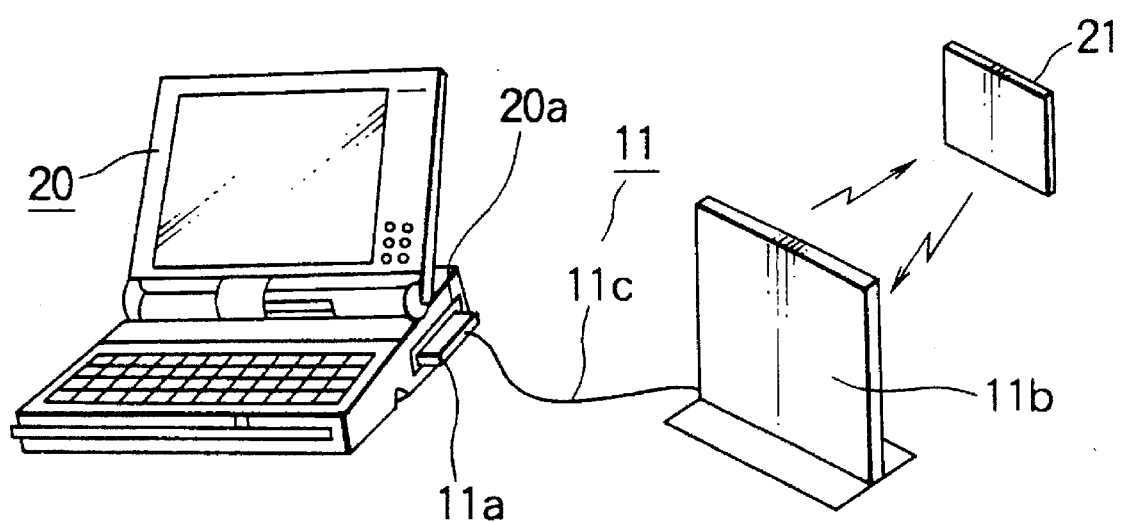
FIG. 4 is a perspective view showing a communication system in accordance with the first embodiment.

FIG. 4 shows a state in which the interface unit 11 and host computer 20 are, electrically connected. The body 11a of the interface unit 17 is inserted in an IC card slot 20a, which is designed for a known contact IC card and located in the host computer 20, a notebook-sized personal computer or the like, so that the side on which the interface connector 12 is formed enters first, and thus mounted in the host computer 20. When mounted, the body 11a of the interface unit 11 has, as illustrated, the other side thereof, which is opposed to the interface connector 12, partly exposed to outside of the IC card slot 20a in the host computer 20. The antenna 11b of the interface unit 11 is placed away from the host computer 20. The antenna 11b, which is linked with the body 11a via the antenna cable 11c as described previously, can be placed optimally for communication with the noncontact IC card 21. The noncontact IC card 21 is placed within an antenna communication zone of the antenna 11b by being hold by a person or by being supported by means of an appropriate supporting means (not shown). As mentioned above, the host computer 20, interface unit 11, and noncontact IC card 21 constitute a communication system for the noncontact IC card 21. The actions of the communication system will be described later.

Figure 5:
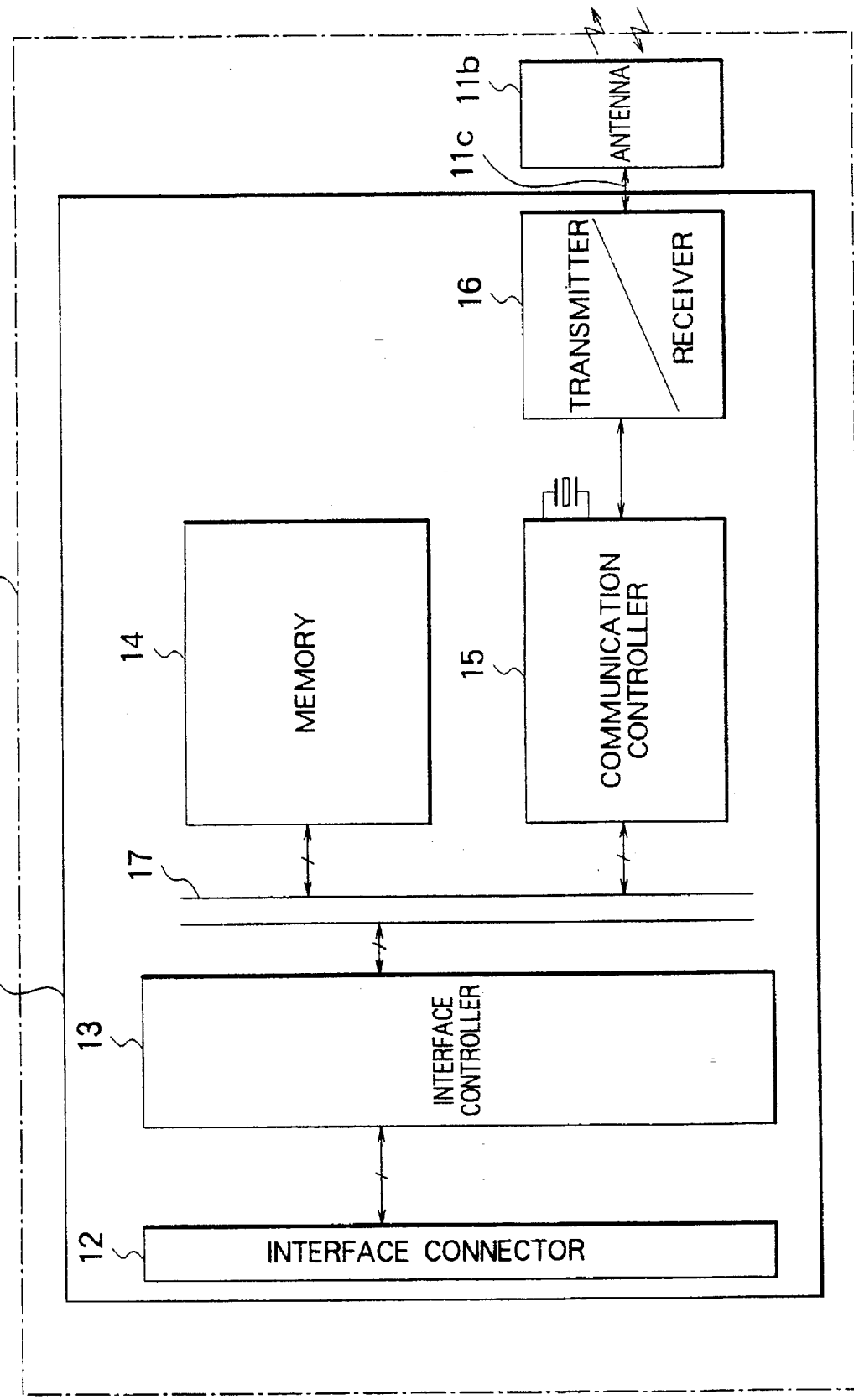
FIG. 5 is a block diagram showing the configuration ofthe interface unit in accordance with the first embodiment

Next, the internal elements of the interface unit 11 in accordance with the present invention will be described. FIG. 5 is a block diagram showing an interface unit 11 in accordance with the present invention. The interface unit 11 is, as shown in FIG. 5, composed of the interface connector 12, an interface controller 13 electrically connected to the interface connector 12 and designed to serve as a first control means for controlling a bidirectional signal relative to the host computer 20, a memory 14 electrically connected to the interface controller 13 through an internal bus 17, a communication controller 15 serving as a second control means for receiving an output signal from the host computer 20 via the interface controller 13 and controlling data communication with the noncontact IC card 21 according to the output signal, a transmitter/receiver 16 electrically connected to the communication controller 15 and composed of a modulator/demodulator, and the antenna 11b connected to the transmitter/receiver 16 via the antenna cable 11c. The transmitter/receiver 16, antenna 11b, and antenna cable 11c are sort of an electromagnetic-wave signal communicating means for transmitting and receiving a bidirectional electromagnetic-wave signal relative to the noncontact IC card. The interface controller 13 generates a control signal which is applied to control the internal elements of the interface unit 11 in response to a memory access signal sent from the host computer 20 and thus controls bidirectional data transfer relative to the host computer 20. The interface controller 13 may be realized with a gate array, a programmable logic array, or a dedicated hard-wired logic. For speeding up access to an internal memory, an MCU or the like may be employed in the interface controller 13.

The memory 14 includes a CMOS static memory or the like. In this embodiment, the memory occupies a 32K-byte field ranging from address 0000H to address 7FFFH in a memory space in the interface unit 11 (See FIG. 7). The memory space in the interface unit 11 will be described later. Since the maximum size of the field in the memory space directly accessible by the host computer 20 is determined by the number of addresses defined in the interface connector 12, the capacity of 32K bytes of the memory 14 is adopted for convenience sake. The memory 14 can be accessed randomly by the host computer 20 via the interface controller 13 over the internal bus 17. The memory 14 is connected to the communication controller 15 over the common internal bus 17 and accessible by the communication controller 15.

Figure 6:
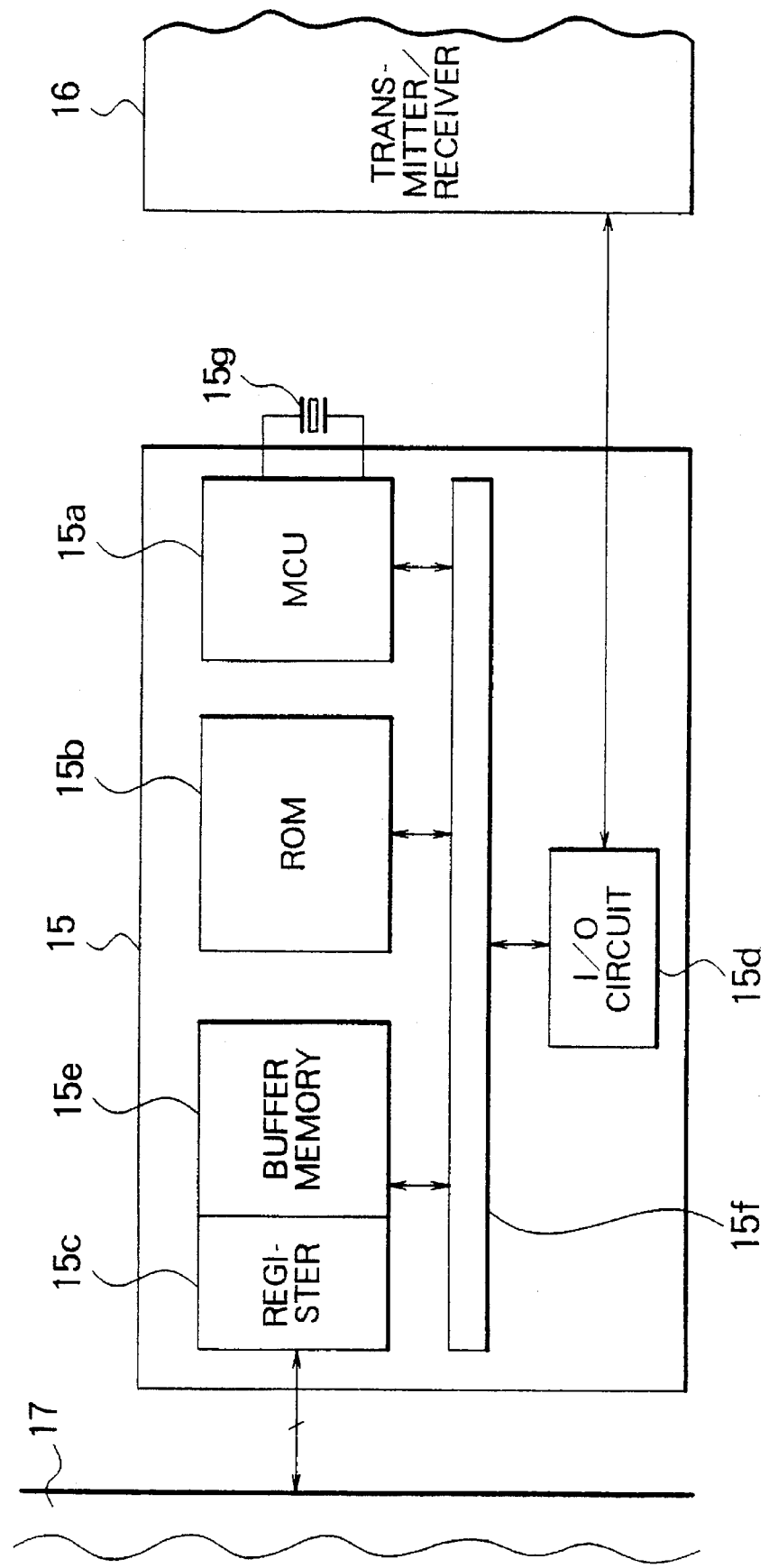
FIG. 6 is a block diagram showing the configuration of a communication controller in the interface unit in accordance with the first embodiment.

The communication controller 15 controls data communication with the noncontact IC card 21. FIG. 6 is a block diagram showing an example of the circuit elements. As shown in FIG. 6, the communication controller 15 consists of an 8- or 16-bit MCU 15a, a ROM 15b (or EPROM or EEPROM) for storing programs controlling the actions of the MCU 15a, a register 15c in which parameters regarding communication control are specified, an I/O circuit 15d for converting data to be transmitted to and received from the transmitter/receiver 16 from parallel data to serial data and vice versa, and a buffer memory 15e for storing communication data temporarily or serving as a work memory used by the programs. These elements are electrically connected through an internal bus 15f. The register 15c and buffer memory 15e are realized with SRAMs or the like and allocated to a field ranging from address F000H to FFFFH in the memory space in which the memory 14 also resides (See FIG. 7). The register 15c and buffer memory 15e are directly accessible by the host computer 20.

Figure 7:
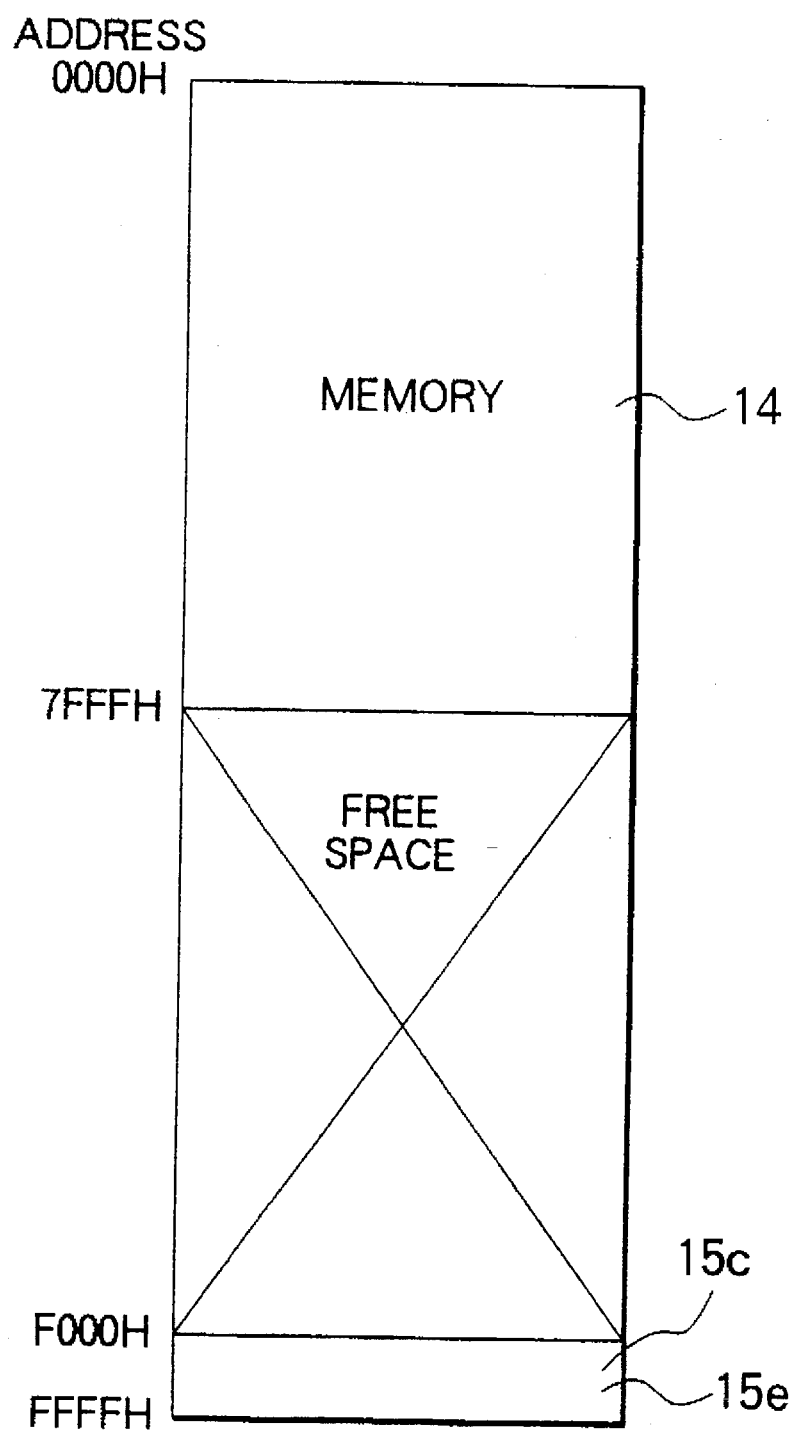
FIG. 7 is a schematic diagram showing a memory space in the interlace unit in accordance with the first embodiment.

FIG. 7 shows the aforesaid memory space in the interface unit 11 which is accessible by the host computer 20 through the interface connector 12. As described above, the field of 32K bytes in size ranging from address 0000H to address 7FFFH is occupied by the memory 14, and the field ranging from address F000H to address FFFFH is occupied by the register 15c and buffer memory 15e incorporated in the communication controller 15. As described previously, the interface connector 12 is compatible with two types of specifications, that is, the specifications for memory cards and for I/O cards. The memory space in FIG. 7 can be used as either a space for memory cards or a space for I/O cards. The spaces for memory cards and I/O cards are accessible by way of independent card control lines over the same address signal line and data signal line. As shown in FIG. 3, as far as the space for memory cards is concerned, an -OE pin of the interface connector 12 is used for reading, and a -WE pin thereof is used for writing. As far as the space for I/O cards is concerned, an -IORD pin is used for reading, and a -IOWR pin is used for writing. Thus, reading and writing are controlled. In FIG. 7, the space for memory cards is installed as a memory space, and reading and writing is therefore controlled using the pins -OE and -WE as an access path. It is understood that reading and writing can be controlled using the pins -IORD and -IOWR as an access path. Reading and writing is also controllable through both the access paths.

Figure 8:
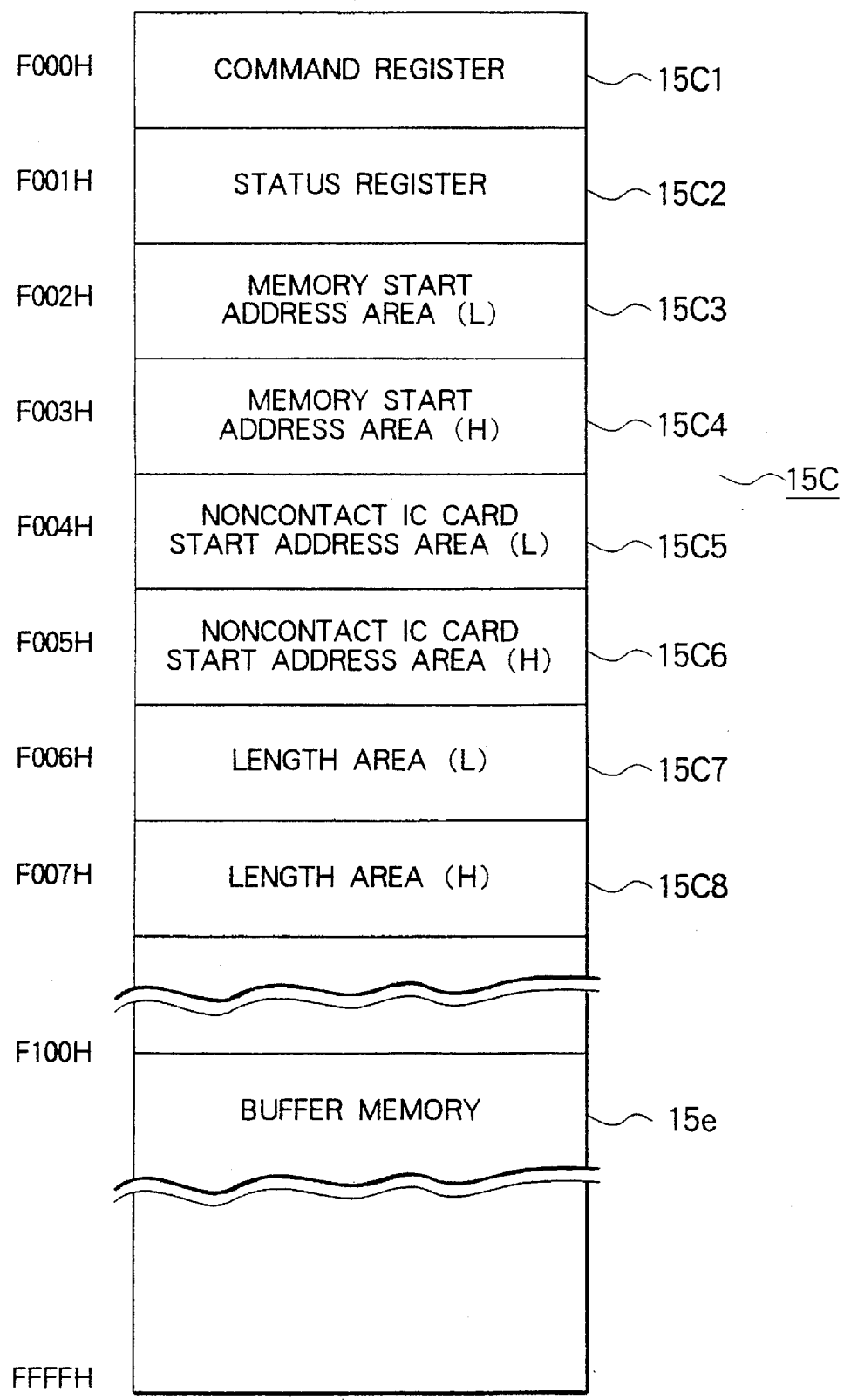
FIG. 8 is a schematic enlarged diagram showing the areas in the memory space in FIG. 7 which are occupied by the communication controller.
Figures 9, 10:
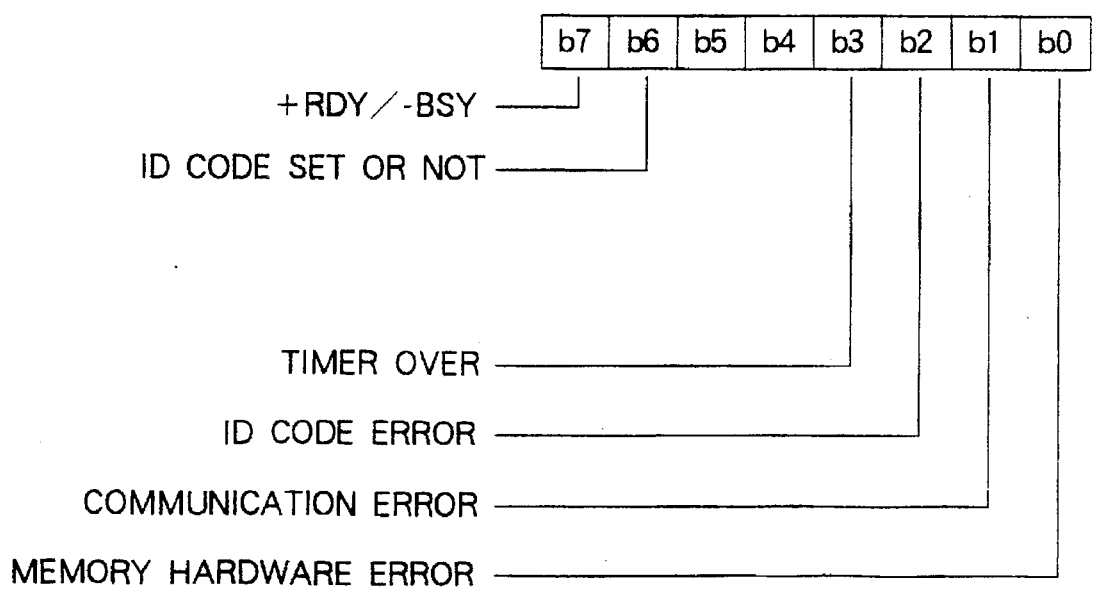
FIG. 9 is a command code table listing command codes to be written in a command register in FIG. 8.
FIG. 10 is a status code table listing definitions of bits of a status register in FIG. 8.

Next, an example of a structure of the field of the memory space in the interface unit 11 shown in FIG. 7, which ranges from address F000H to FFFFH and is occupied by the register 15c and buffer memory 15e that are incorporated in the communication controller 15, will be described. FIG. 8 shows an example. As shown in FIG. 8, an area ranging from address F000H to F0FFH is occupied by the register 15c, and an area ranging from address F100H to FFFFH is occupied by the buffer memory 15e. To begin with, registers of the register 15c will be described one by one. A command register 15c1 is allocated to address F000H in the register 15c. The command register 15c1 defines a instruction indicating processing to be executed by the communication controller 15. For example, processing to be performed on a noncontact IC card is defined as shown in FIG. 9. Four low-order bits (b0 to b3) are used to indicate reading and writing of a memory. Four high-order bits (b4 to b7) are used to specify an executive option. ID stands for an identification code (four bytes) inherent to the noncontact IC card 21, and is used to identify the noncontact IC card 21. The functions of the commands listed in FIG. 9 will be described below.

Read: used to read the data in the memory of the noncontact IC card 21 and transfer the data or contents to the memory 14 incorporated in the body 11a of the interface unit 11.

Write: used to write the data or contents of the memory 14 in the body 11a of the interface unit 11 into the noncontact IC card ID Read: used to receive an ID (identification) code of the noncontact IC card 21 and stores the ID code in an ID register (not shown) included in the register 15c in the communication controller 15.

ID Send: used to send the contents of the ID register in the communication controller 15 to the noncontact IC card 21 for comparison with the ID code of the noncontact IC card 21. If the contents disagree with the ID code, command processing is canceled.

ID Compare: used to receive an ID code from the noncontact IC card 21 and compare it with the contents of the ID register in the communication controller 15. If the ID code disagrees with the contents, command processing is canceled.

ID Reset: used to initialize the contents of the ID register in the communication controller 15.

Assuming that the commands are defined as mentioned above, when 00010001b is set as a command code in the command register 15c1, four low-order bits indicate the Read command as shown in FIG. 9 and four high-order bits indicate the ID Read command. The communication controller 15 therefore reads the memory in the noncontact IC card 21 (in other words, the communication controller 15 transfers the data or contents of the memory in the noncontact IC card 21 to the memory 14 in the interface unit 11), and reads the ID code of the noncontact IC card 21 (in other words, the ID code of the noncontact IC card 21 is stored in the ID register in the communication controller 15 and retained unless the ID register is reset) at the same time. When 00100010b is set as a command code in the command register 15c1, the contents of the ID register in the communication controller 15 and the data in the memory 14 in the interface unit 11 are transmitted concurrently. In the noncontact IC card 21, the received contents of the ID register in the communication controller 15 are compared with the ID code of the noncontact IC card 21. When the contents agree with the ID code, the data which are stored in the memory 14 in the interface unit 11 and received by the noncontact IC card are written in the noncontact IC card 21.

A status register 15c2 is allocated to address F0001H in the register 15c as shown in FIG. 8. The status register 15c2 is a register for use in checking the state of action of the communication controller 15 or the occurrence of a communication error. The status register 15c2 can be read directly by the host computer 20. By checking the contents of the status register 15c2, the host computer 20 monitors completion of reading or writing of the noncontact IC card 21 and executes processing properly. FIG. 10 lists definitions of the bits of the status register. The functions of the bits will be described below.

+RDY/−BSY: indicates that the communication controller 15 has accessed the noncontact IC card 21 or memory 14 (b7).

ID Code Set or Not: indicates whether an ID code has been set in the ID register in the communication controller 15 (in other words, whether the noncontact IC card 21 to be accessed has been placed) (b6).

Timer Over: indicates occurrence of a monitor timer error including an event in which no response is returned during communication with the noncontact IC card 21 (b3).

ID Code Error: indicates that the contents of the ID register in the communication controller 15 disagree with the ID code of the noncontact IC card 21 with which communication is under way (b2).

Communication Error: indicates occurrence of an error during communication with the noncontact IC card 21 (b1).

Hardware Error: indicates occurrence of a hardware failure during reading or writing of a memory (b0).

The operation of the +RDY/−BSY bit in the status register 15c2 will be described. The memory 14 in the interface unit 11 of the present invention is, as mentioned above, designed to be accessed by the host computer 20 and communication controller 15 over the common internal bus 17. In an effort to prevent conflict of access requests made by the host computer 20 and communication controller 15, the interface unit 11 gives higher priority to an access request made by the communication controller 15. While accessing the memory 14, the communication controller 15 sets the +RDY/−BSY bit of the status register 15c2 in the register 15c therein to a low-level state. Consequently, a low-level signal is applied to the +RDY/−BSY pin or −WAIT pin of the interface connector 12 through the interface controller 13. Thus, the host computer 20 is placed in an access disabled state.

When conflict of access requests is prevented as mentioned above, throughput decreases. For overcoming this drawback, for example, the internal bus 17 is designed to serve as a dual bus having the capabilities of a host computer-side access bus linking the interface controller 13 and memory 14 and of a communication controller-side access bus linking the communication controller 15 and memory 14. The memory 14 is designed to be of a dual-port type, so that the host computer 20 and communication controller 15 can access the memory 14 concurrently.

Next, memory start address areas 15c3 and 15c4 allocated to addresses F0002H and F003H in FIG. 8 will be described. The memory start address areas 15c3 and 15c4 are registers in which a start address in the memory 14 in the interface unit 11 to be accessed by the communication controller 15 is specified. An address value is represented by two bytes. The start address area in which a high-order byte is set is therefore distinguished as H, while the start address area in which a low-order byte is set is distinguished as L. Likewise, noncontact IC card start address areas 15c5 and 15c6 allocated to addresses F004H and F005H in FIG. 8 are registers in which a start address in the memory in the noncontact IC card 21 to be accessed is specified. The start address in the memory in the noncontact IC card 21 is also represented by two bytes. The noncontact IC card start address area 15c5 in which a high-order byte is set is distinguished as H, while the start address area 15c6 in which a low-order byte is set is distinguished as L. Length areas 15c7 and 15c8 allocated to addresses F006H and F007H in FIG. 8 are registers in which a data length to be transferred by the communication controller 15 is specified. Other registers such as the aforesaid ID register may be allocated to the field ranging from address F008H to F0FFH if necessary.

The field ranging from address F100H to FFFFH in FIG. 8 is, as mentioned above, occupied by the buffer memory 15e in the communication controller 15 and used as a work memory by the communication controller 15. The field may be used as a communication buffer for communication with the noncontact IC card 21. The buffer memory 15e need not always be accessible by the host computer 20. For simplified circuitry, the buffer memory 15e may not be allocated to the address space in the host computer 20 but may be designed as a local memory residing in the communication controller 75. The communication controller 15 has the aforesaid configuration.

Next, the transmitter/receiver 16 shown in FIG. 5 will be described. As shown in FIGS. 5 and 6, the transmitter/receiver 16 including a modulator/demodulator is electrically connected to the communication controller 15. The transmitter/receiver 16 modulates serial transmission data sent from the communication controller 15 (for example, using an ASK technique) so as to produce a transmission signal to be transmitted to the noncontact IC card 21 by way of the antenna 11b, and demodulates a transmission signal received from the noncontact IC card 21 by way of the antenna 11b so as to convert it into serial digital data.

Figure 11:
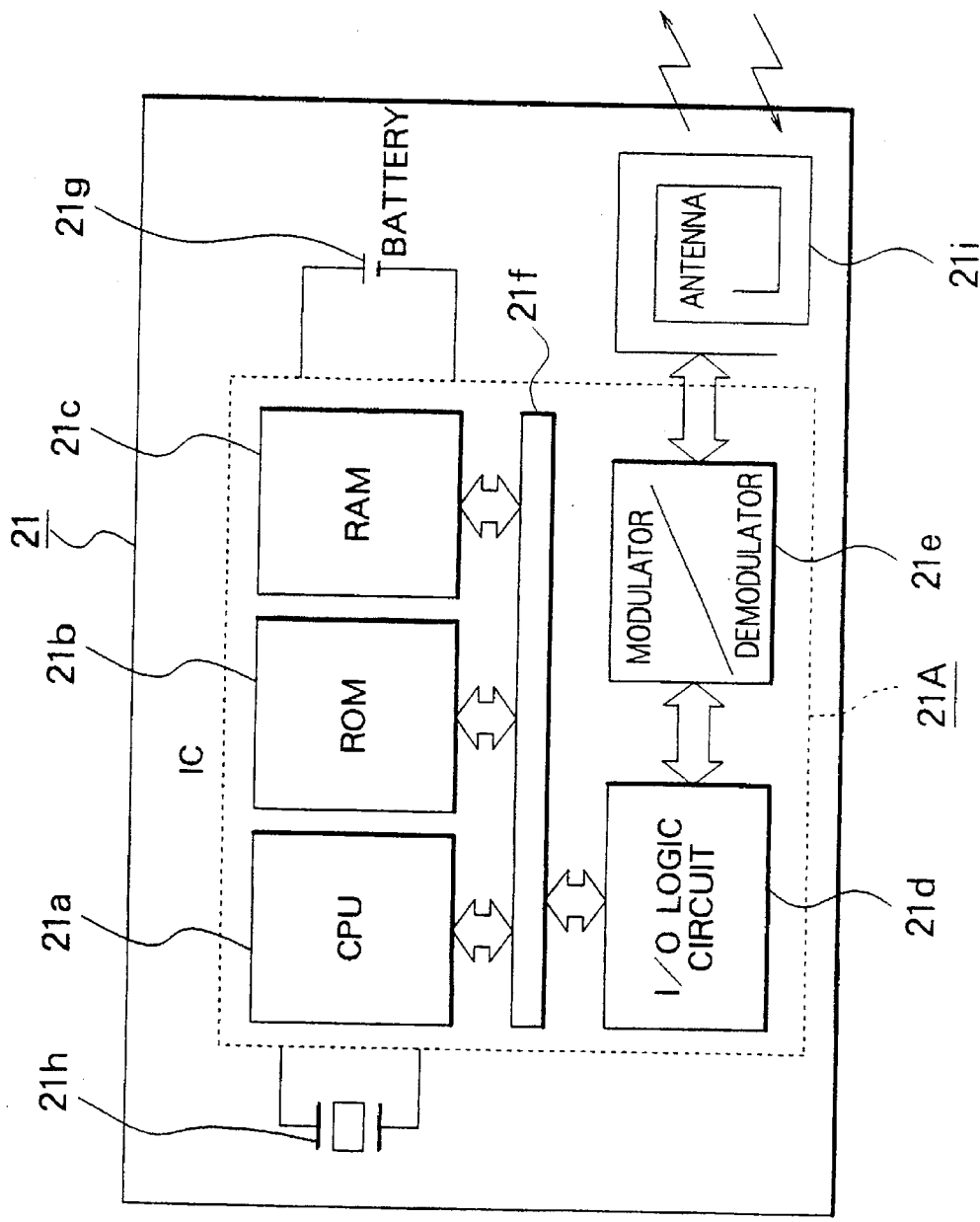
FIG. 11 is a block diagram showing the configuration of a noncontact IC card in accordance with the first embodiment.

FIG. 11 shows the internal elements of the noncontact IC card 21 to be accessed by the host computer 20 via the interface unit 11. The noncontact IC card 21 includes, as shown in FIG. 11, a CPU 21a realized with a CMOS 8-bit microcomputer or the like. The CPU 21a controls the actions of the noncontact IC card 21 according to programs stored in a ROM 21b or RAM 21c. The RAM 21c is composed of a CMOS SRAM and serves as a memory for storing data to be transferred to the interface unit 11. An I/O logic circuit 21d and a modulator/demodulator 21e are circuits for transmitting data to or receiving data from the interface unit 11. The above elemental units are electrically connected over an internal bus 21f and integrated into a semiconductor chip 21A. The semiconductor chip 21A is linked to a battery 21g, an oscillator 21h for generating clock pulses for the CPU 21a, and an antenna 21i for transmitting or receiving an electromagnetic-wave signal.

The battery 21g in the noncontact IC card 21 is a coin-shaped battery or a lithium battery and is thin. Depending on the nature of a battery, batteries fall into primary batteries that cannot be charged and secondary batteries that can be charged and reused. Either a primary battery or a secondary battery can be used as the battery 21g. For the secondary battery, it can be charged by converting an electromagnetic-wave signal (ac voltage) received through the antenna 21i into dc current by means of a full-wave rectifier or a half-wave rectifier. The secondary battery can therefore be used repeatedly and enjoy a long service life. It is known that as far as the distance from an electromagnetic-wave source is within a quotient of a wavelength divided by 2 pi, the strength of an electromagnetic wave received through the antenna 21i is inversely proportional to the cube of the distance. For charging a secondary battery efficiently, the antenna 21i of the noncontact IC card 21 should be positioned as close as possible to the antenna 11b of the interface unit 11 serving as the electromagnetic-wave source. When the noncontact IC card 21 is unused, the interface unit 11 may be placed in a (charge) mode in which it constantly supplies an electromagnetic-wave signal via the antenna 11b thereof, so that the secondary battery incorporated in the noncontact IC card 21 is charged.

When inactivated, the CPU 21a in the noncontact IC card 21 is in a (sleep) mode in which the oscillator 21h is stopped in order to suppress current consumption. For activating the CPU 21a, the interface unit 11 supplies a triggering signal having a predetermined frequency to the antenna 21i in the noncontact IC card 21, and thus causes the oscillator 21h to start oscillating. Consequently, the CPU 21a is activated.

During charging of the noncontact IC card 21, activation of the CPU 21a in the noncontact IC card 21 must be disabled so as to prevent the CPU 21a from being activated. A conceivable method of disabling the activation will be described below.

(1) A carrier frequency set for an activation signal intended to activate the CPU 21a or for a data signal during normal operation is different from a power frequency used for charging. A frequency changer means for changing frequencies between the charge mode and normal mode is include in the interface unit 11. In consideration of restrictions imposed on radio-wave propagation, when two antennas are placed mutually close in order to supply power efficiently, the power frequency (several megahertz) set for charging should be higher than the carrier frequency (several hundreds of kilohertz) set for the above signal.

Figure 12:
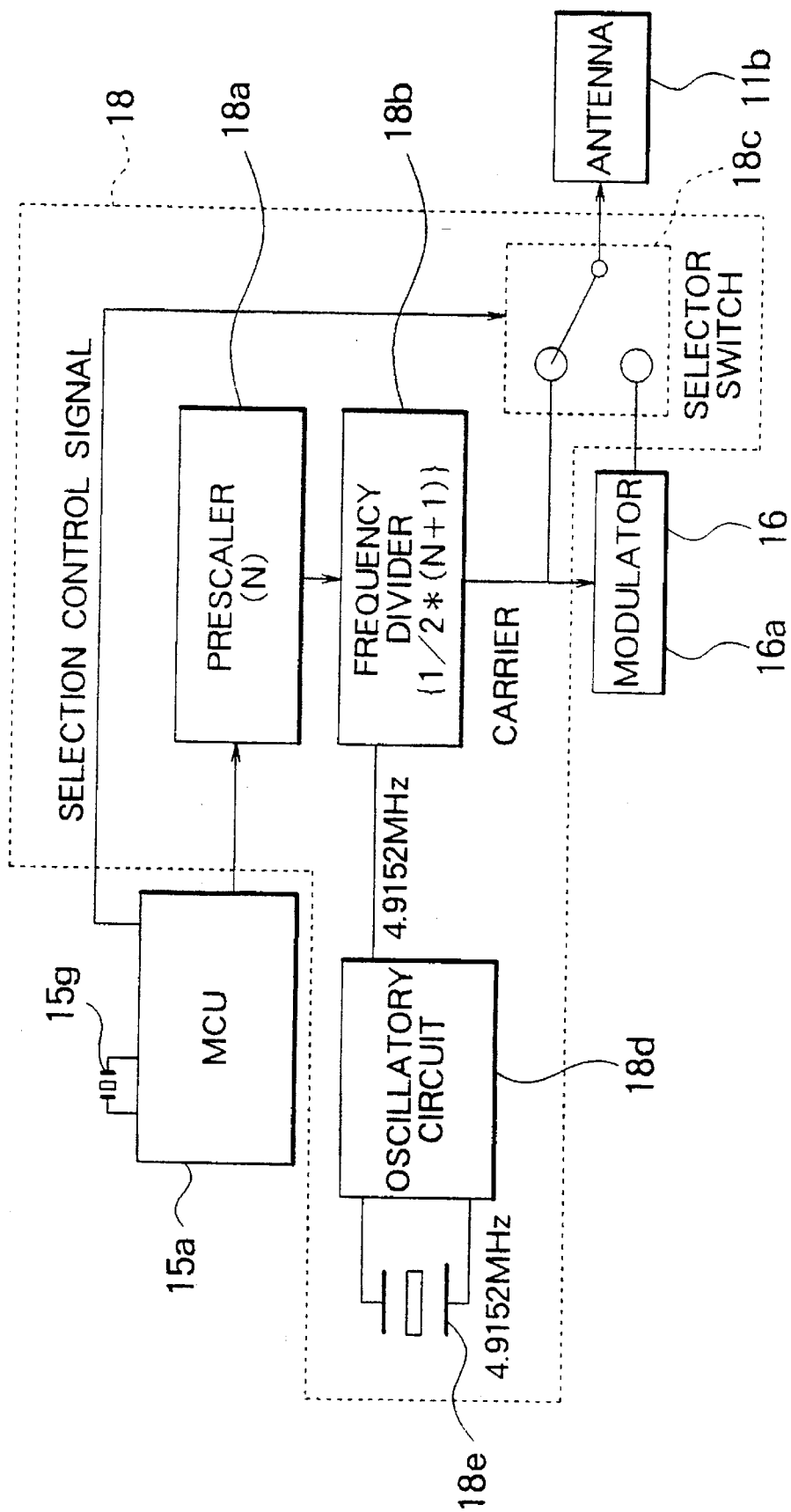
FIG. 12 is a block diagram showing a frequency changer means included in the interface unit in accordance with the first embodiment

FIG. 12 is a block diagram showing the configuration of a frequency changer means 18. A prescaler 18a in which a predetermined value is set as a division factor N in response to a signal sent from the MCU 15a, and a selector switch 18c for making different selections between charging and normal operation in response to a selection control signal sent from the MCU 15a are, as shown in FIG. 12, electrically connected to the MCU 15a (See FIG. 6) incorporated in the communication controller 15. A frequency divider 18b is electrically connected to the prescaler 18a. An oscillator 18e and an oscillatory circuit 18d are electrically connected to the frequency divider 18b. The frequency divider 18b inputs a division factor N from the prescaler 18a, divides an oscillatory frequency of the oscillator 18e and oscillatory circuit 18d, and outputs a carrier. The prescaler 18a, frequency divider 18b, selector switch 18c, oscillator 18e, and oscillatory circuit 18d are part of the frequency changer means 18. In FIG. 12, the oscillator 18e is independent of the oscillator 15g (See FIG. 6) connected to the MCU 15a. Alternatively, the oscillator 15g connected to the MCU 15a may be designed to have the capability of the oscillator 18e.

During normal operation, the MCU 15a in the communication controller 15 sets a predetermined value as a division factor N in the prescaler 18a and places a 0 in the selection control signal to be fed to the selector switch 18c. In response to the selection control signal, the selector switch 18c electrically connects the output stage of the modulator 16a in the transmitter/receiver 16 (See FIG. 5) to the antenna. For normal operation, for example, when the division factor N of the prescaler 18a is set to 5, the frequency divider 18b divides the oscillatory frequency 4.9152 MHz of the oscillator 18e and oscillatory circuit 18d according to the formula {½(N+1)}, and outputs a carrier having a frequency of 409.6 kHz.

For charging, the MCU 15a in the communication controller 15 sets the division factor N of the prescaler 18a to a value smaller than the one for normal operation, and places a 1 in the selection control signal. In response to the selection control signal, the selector switch 18c electrically and directly connects the output line of the carrier sent from the frequency divider 18b to the antenna. For charging, for example, when the division factor N of the prescaler 18a is set to 1, the frequency divider 18b divides the oscillator frequency 4.9152 MHz of the oscillator 18e and oscillatory circuit 18d according to the formula {½(N+1)}, and outputs a carrier having a frequency of 1.2288 MHz directly to the antenna 11b (See FIG. 5).

Figure 13:
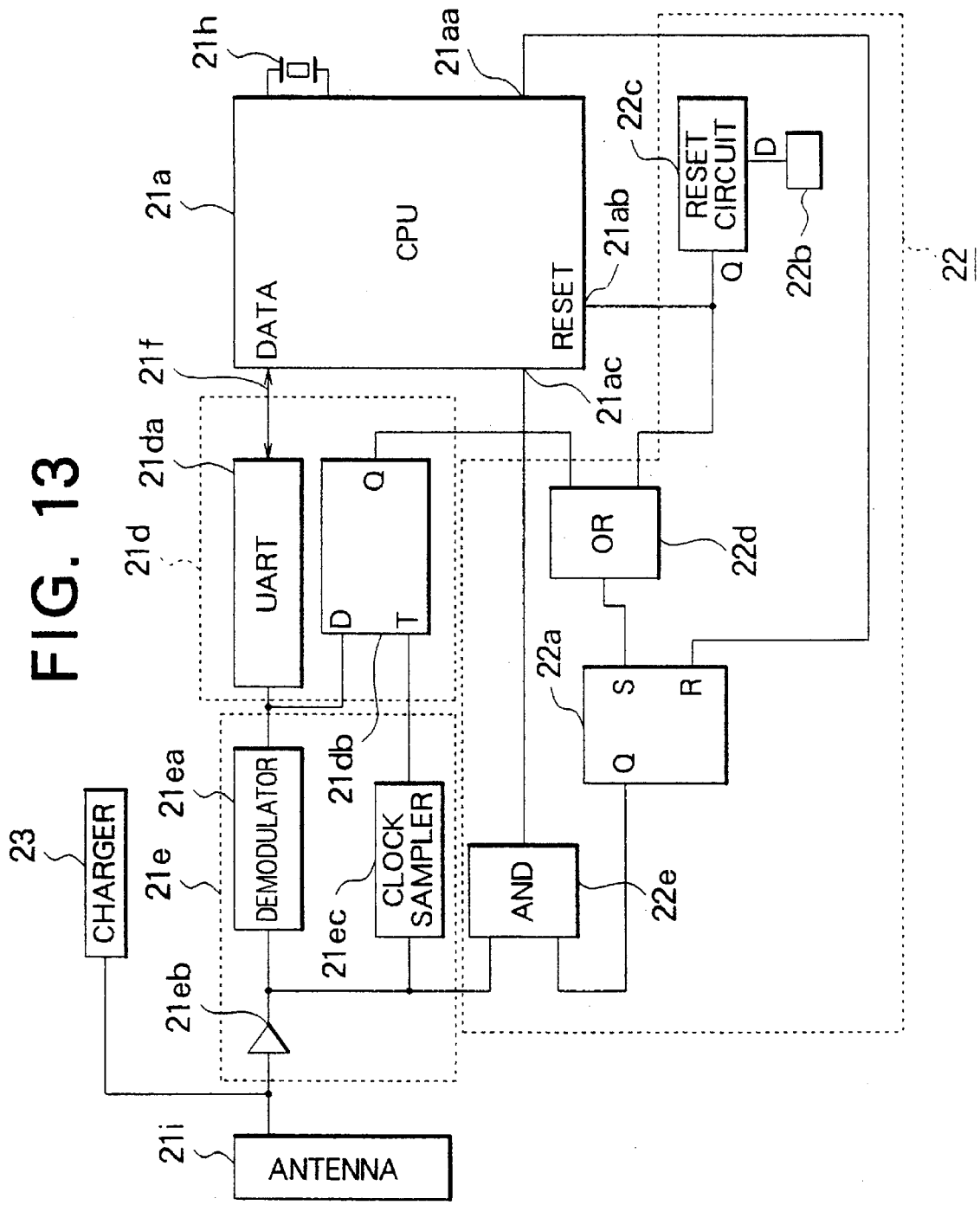
FIG. 13 is a block diagram showing a charge mode selector means included in the noncontact IC card in accordance with the first embodiment.

(2) A charge mode selector means serving as a cutoff means for temporarily cutting off a triggering signal sent from the antenna 11b of the interface unit 11 for fear that the CPU 21a may be activated during charging is incorporated in the noncontact IC card 12. FIG. 13 is a block diagram showing the configuration of the charge mode selector means. As mentioned above, the I/O logic circuit 21d is electrically connected to the antenna 21i in the noncontact IC card 21 (See FIG. 11) via the modulator/demodulator 21e. The I/O logic circuit 21d is electrically connected to the CPU 21a by way of the internal bus 21f. The CPU 21a is electrically connected to a mode change register 22a that includes an R-S flip-flop or the like. An AND circuit 22e is connected to the mode change register 22a and modulator/demodulator 21e, and designed to produce an AND signal using signals sent from the mode change register 22a and modulator/demodulator 21e and to supply the AND signal to the CPU 21a. The I/O logic circuit 21d is electrically connected to the mode change register 22a via an OR circuit 22d. The charge mode selector means 22 serving as a cutoff means is composed of the mode change register 22a, AND circuit 22e, and OR circuit 22d. If necessary, the charge mode selector means 22 may further include a reset circuit 22c and a reset receiver 22b which will be described later.

Next, actions will be described. The charge mode selector means 22 has the aforesaid elements. For setting up the charge mode, first, the host computer 20 (See FIG. 4) transmits a predetermined charge selection command to the antenna 21i in the noncontact IC card 21 via the interface unit 11. The charge selection command is fed to the CPU 21a via a demodulator 21ea in the modulator/demodulator 21e and a universal asynchronous receiver/transmitter (UART) 21da in the I/O logic circuit 21d. After interpreting the charge selection command, the CPU 21a outputs a high-level pulse to a reset terminal R of the mode change register 22a through a charge mode selector terminal 21aa of the CPU 21a. The CPU 21a shifts to a sleep mode in which the oscillator 21h connected to the CPU 21a stops oscillating. When the high-level pulse is applied to the reset terminal R of the mode change register 22a, the output supplied from the mode change register 22a through an output terminal Q is driven low. When the output supplied from the mode change register 22a is driven low, an activation signal that is an AND signal supplied from the AND circuit 22e goes normally low. A low-level signal is applied to an activation signal input terminal 21ac of the CPU 21a. Consequently, the CPU 21 is disabled from activating.

For setting up the normal mode, there are two techniques: a reset technique and a command technique. To begin with, the reset technique will be described. According to the reset technique, first, a reset instruction sent from the host computer 20 is converted into a reset signal by the interface unit 11 and then supplied. A reset receiver 22a receives the reset signal. For transmitting the reset signal, electromagnetic waves or light may be used to achieve noncontact transmission. Alternatively, a switching circuit may be used as an input circuit for receiving the reset signal in order to achieve contact transmission. In response to the reset signal received by the reset receiver 22b, a high-level pulse is applied from a reset circuit 22c to a reset terminal RESET 21ab of the CPU 21a and to a set terminal S of the mode change register 22a via the OR circuit 22d. When receiving the high-level pulse through the reset terminal 21ab, the CPU 21a releases the sleep mode in which the oscillator 21h is stopped oscillating, activates the oscillator 21h, and restarts the execution of a program residing in the ROM 21b or RAM 21c (See FIG. 11) from the step of the program at the time of resetting. When the high-level pulse is applied to the set terminal S of the mode change register 22a, the output supplied from the mode change register 22a through the output terminal Q is driven high. The activation signal sent to the AND circuit 22e through a reception gate 21eb of the modulator/demodulator 21e is delivered to the CPU 21a through the activation signal input terminal 21ac via the AND circuit 22e. Consequently, the normal mode is set up.

Next, the command technique will be described. According to the command technique, first, a pre-defined charge mode release command is transmitted to the antenna 21i. The charge mode release command received by the antenna 21i is fed to each of the demodulator 21ea and a clock sampler 21ec through the reception gate 21eb of the modulator/demodulator 21e. The charge mode release command fed to the demodulator 21ea is applied to an input terminal D of a charge mode release command collator 21db in the I/O logic circuit 21d. The charge mode release command fed to the clock sampler 21ec has a clock component sampled by the clock sampler 21ec so as to produce a clock signal. The clock signal is then applied to an input terminal T of the charge mode release command collator 21db. The charge mode release command collator 21db latches the charge mode release command received through the input terminal D synchronously with the clock signal received through the input terminal T, and collates the charge mode release command with a pre-set command code. When the charge mode release command agrees with the command code, the charge mode release command collator 21db outputs a high-level signal through the output terminal Q. The high-level signal is applied to the set terminal S of the mode change register 22a via the OR circuit 22d. This causes the output of the mode change register 22a to go high. The activation signal sent through the reception gate 21eb in the modulator/demodulator 21e is delivered to the CPU 21a through the activation signal input terminal 21ac. Consequently, the normal mode is set up.

As mentioned above, for preventing the CPU 21a in the noncontact IC card 21 from being activated during charging of the noncontact IC card 21, the two techniques (1) and (2) may be used in combination or either of them may be employed.

Figure 14:
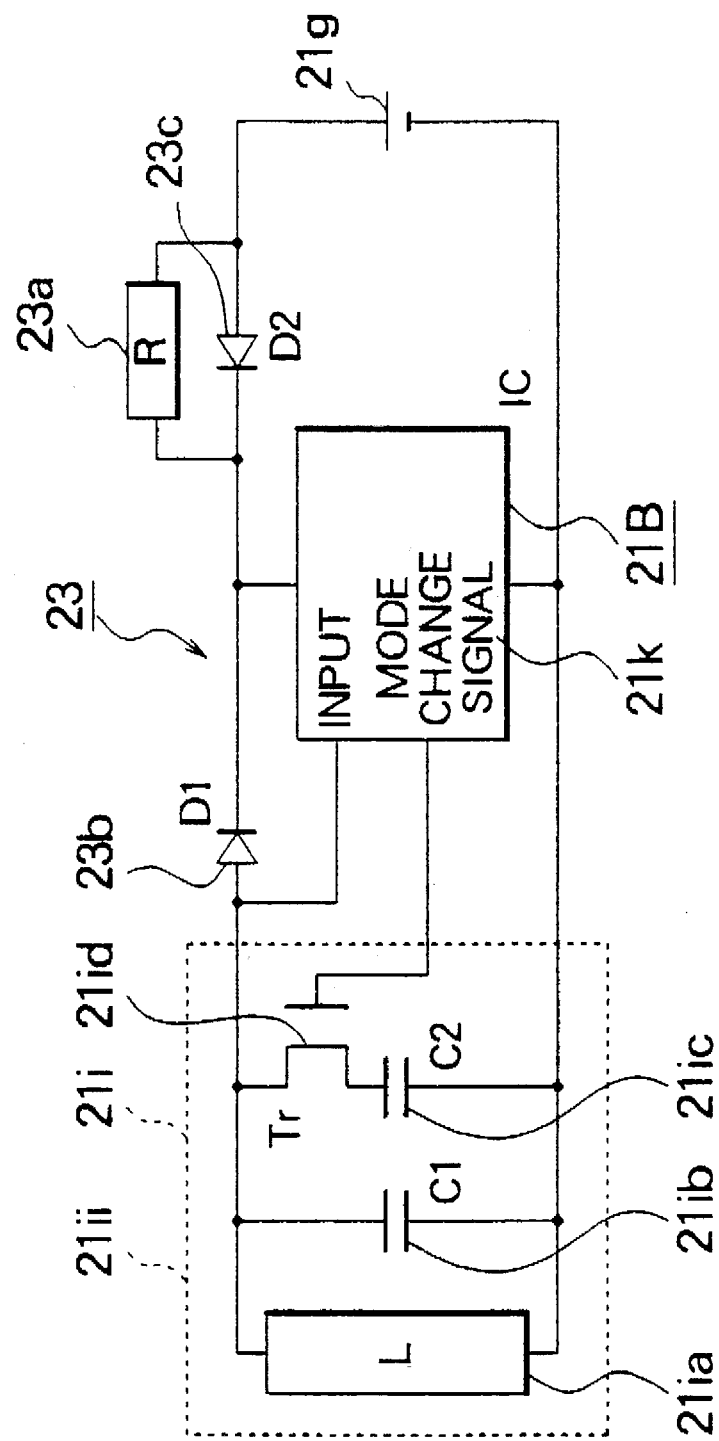
FIG. 14 is a block diagram showing a frequency changer means included in the noncontact IC card in accordance with the first embodiment.

In the above description, the frequency changer means is included in the interface unit. A frequency changer means for changing frequencies between the charge and normal modes may be included in the noncontact IC card 21. FIG. 14 is a block diagram showing an antenna circuit 21ii incorporated in the antenna 21i in the noncontact IC card 21 and the elements of a charger 23. As shown in FIGS. 13 and 14, the charger 23 is connected to the antenna circuit 21ii and a semiconductor chip 21B in the noncontact IC card 21. The semiconductor chip 21B has the same elements as those of the semiconductor chip 21A shown in FIG. 11 as well as a mode change signal output means 21k for outputting a mode change signal. The antenna circuit 21ii has an antenna circuit including an LC parallel-resonant circuit such as an equivalent circuit in FIG. 14. Herein, L denotes the inductance of a coil 21ia, and C1 and C2 denote the capacitances of capacitors 21ib and 21ic. Tr denotes a transistor 21id. The charger 23 is, as illustrated, composed of a diode (D1) 23b, and a resistor (R) 23a and a diode (D2) 23c which are connected in parallel with each other. 21g denotes a secondary battery (See FIG. 11) to be charged by the charger 23.

Next, actions will be described. In the charge mode, the mode change signal supplied from the mode change signal output means 21k on the semiconductor chip 21B to the antenna circuit 21i is driven low. The transistor 21id is therefore turned off. When the transistor 21id is off, the antenna circuit 21ii if acts as a resonant circuit composed of the coil 21ia and capacitor (C1) 21ib. The resonant frequency is determined by the formula $1/\{2\pi\sqrt{(L\times C1)}\}$. An ac signal received in the charge mode is half-rectified through the diode (D1) 23b and then used to charge the secondary battery 21g by way of the resistor 23a. In the normal mode, the transistor 21id is turned on. The total capacitance contained in the antenna circuit 21ii therefore gets larger by the capacitance of the capacitor (C2) 21ic, while the resonant frequency gets lower. Thus, when the aforesaid antenna circuit 21ii if serving as a frequency changer means is incorporated in the antenna 21i, the antenna resonant frequency can be raised in the charge mode and lowered in the normal mode.

Figure 15:
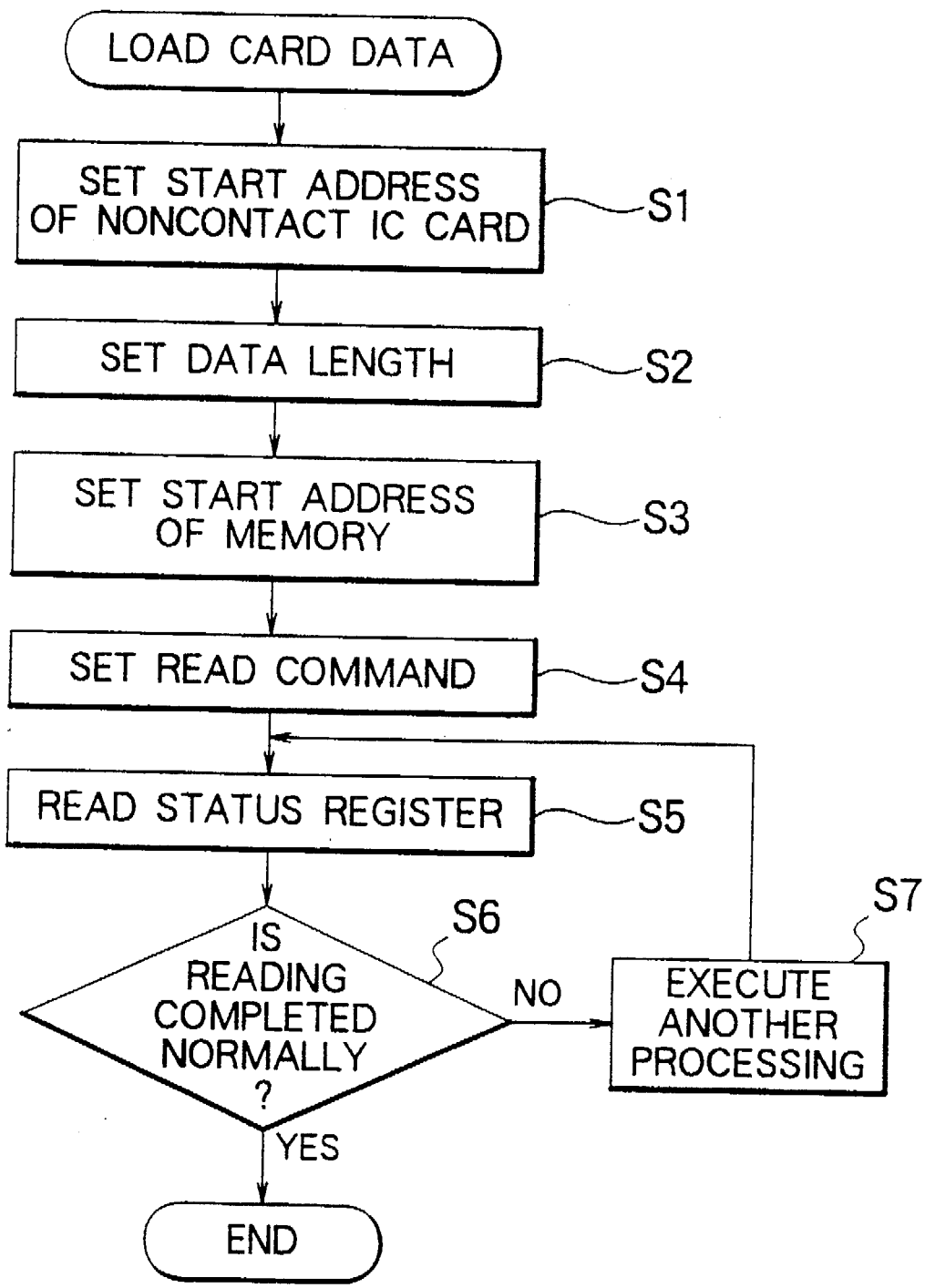
FIG. 15 is a flowchart describing reading of data from the noncontact IC card in accordance with the first embodiment.

Next, the actions of the interface unit 11 of the present invention and those of a communication system using the interface unit 11 will be described. To begin with, reading of the noncontact IC card 21 will be described in conjunction with the flowchart of FIG. 15. First, for reading data from the memory residing in the RAM 21c in the noncontact IC card 21 into the memory 14 in the interface unit 11, the host computer 20 places the start address of the data which should be read from the memory in the RAM 21c in the noncontact IC card 21 in the noncontact IC card start address areas 15c5 and 15c6 in the register 15c in the communication controller 15 shown in FIG. 8 (step S1). The host computer 20 then sets the data length of the data, which should be read from the memory in the RAM 21c , in the length area 15c7 in the register 15c (step S2). A start address of the memory 14 at which the communication controller 15 should store the data read from the memory in the RAM 21c in the noncontact IC card 21 is set in the memory start address areas 15c3 and 15c4 in the register 15c (step S3). The host computer 20 then writes a reading code 00010001b in the command register 15c1 in the register 15c (step S4).

With the reading code written in the command register 15c1, the communication controller 15 places the +RDY/–BSY bit of the status register 15c2 in a low-level state, applies a low-level signal to the +RDY/–BSY pin of the interface connector 12 via the interface controller 13, and starts accessing a noncontact IC card. Specifically, the communication controller 15 transmits a triggering signal for use in activating the CPU 21a in the noncontact IC card 21, and repeatedly provides the noncontact IC card 21 with an instruction asking for reading of the ID code of the noncontact IC card 21, and an instruction asking for reading of data identified with the start address and data length specified at steps S1 and S2. Herein, if the noncontact IC card 21 lies within the communication zone of the antenna 11b , it sends a response to the reading instruction sent from the communication controller 15. When data to be transmitted has a large length, it is segmented into a plurality of blocks and then transmitted. For reliable communication with the noncontact IC card 21, the noncontact IC card 21 should preferably be placed at a fixed location as close as possible to the antenna 11b. The communication controller 15 temporarily holds responses returned from the noncontact IC card 21 in the buffer memory 15e and sequentially transfers them to the memory 14 in the interface unit 11. Alternatively, the communication controller 15 may be designed to transfer read data directly to the memory 14 without using the buffer memory 15e. For quicker access, access to the noncontact IC card 21 may be separated from transfer of data to the memory 14, and dedicated hardware (DMA) may be used for the data transfer. Thus, processing efficiency improves.

While the communication controller 15 is accessing the noncontact IC card 21, the host computer 20 reads the contents of the status register 15c2 in the communication controller at certain intervals (steps S5), and then checks the state of action made by the communication controller 15 and determines whether reading is completed (step S6). Using an interrupt signal sent for the checking or determination, the host computer 20 may execute another processing (step S7). Otherwise, a signal applied to the +RDY/–BSY pin of the interface connector 12 may be used as an interrupt signal to execute another process. When completing reading, the communication controller 15 places the +RDY/–BSY bit of the status register 15c2 in a high-level state, applies a high-level signal to the +RDY/–BSY pin of the interface connector 12, and sets other necessary status bits.

The host computer 20 determines whether the communication controller 15 has completed reading, reads the contents of the status register 15c2, and checks if an error has occurred (steps S5 and S6). If an error has occurred the host computer 20 retries or suspends the processing. If no error has occurred, the host computer 20 can access (read or write) the memory 14 in the interface unit 11 as quickly and freely as it can with respect to a known contact IC card.

Figure 16:
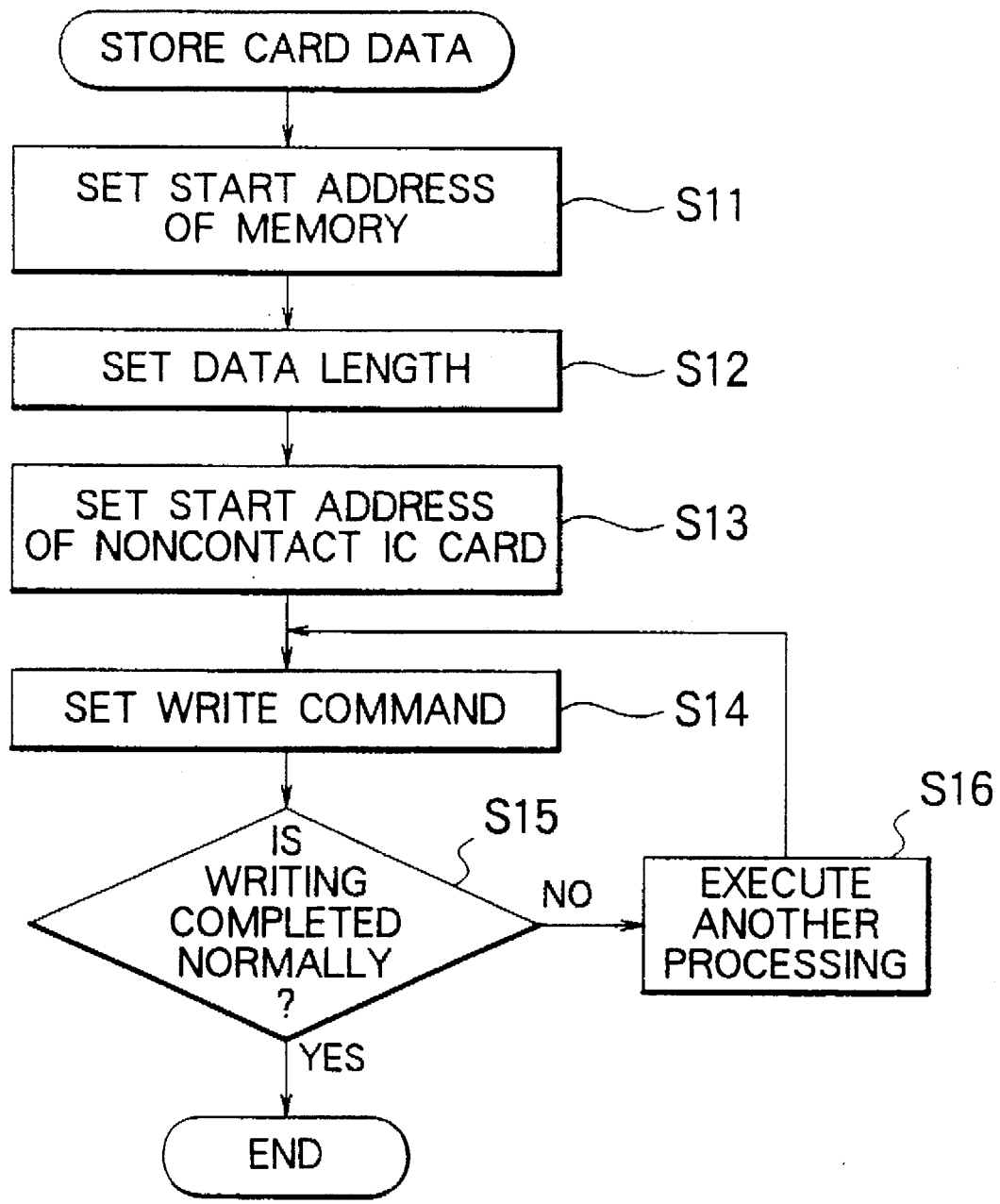
FIG. 16 is a flowchart describing writing of data in the noncontact IC card in accordance with the first embodiment.

Next, writing of data in the noncontact IC card 21 will be described in conjunction with the flowchart of FIG. 16. Writing proceeds substantially in the same manner as aforesaid reading. First, for writing data from the memory 14 in the interface unit 11 into the RAM 21c in the noncontact IC card 21, the host computer 20 sets the start address of the data, which should be written from the memory 14 to the RAM 21c, in the memory start address areas 15c3 and 15c4 in the register 15c in the communication controller 15 shown in FIG. 8 (step S11). The host computer 20 then sets the data length of the data to be written in the length area 15c8 in the register 15c (step S12). The host computer 20 also sets a start address of the RAM 21c in the noncontact IC card 21, from which address the data read from the memory 14 should be written, in the noncontact IC card start address areas 15c5 and 15c6 in the register 15c (step S13). Thereafter, the host computer 20 writes a writing code 00100010b in the command register 15c1 in the register 15c (step S14).

With the writing command sent from the host computer 20, the communication controller 15 transmits the contents of the ID register in the communication controller 15 and the data, which is read from the memory 14 and to be written in the noncontact IC card 21, simultaneously. The noncontact IC card 21 compares the received contents of the ID register with its own ID code. If the contents agree with the ID code, the transmitted data is written. As mentioned above, after the noncontact IC card 21 confirms that the received contents of the ID register agree with the ID card, data is written therein. This sequence successfully prevents writing of an incorrect card.

While the communication controller 15 is accessing the noncontact IC card 21, the host computer 20 reads the contents of the status register 15c2 in the communication controller 15 at certain intervals in the same manner as it does during reading. The host computer 20 then checks the state of the communication controller 15 and determines whether writing has been completed (step S15). Alternatively, using the result of the checking and determination as an interrupt signal, the host computer 20 may execute another process (step S16). The host computer 20 determines whether the communication controller 15 has completed writing, reads the contents of the status register 15c2, and checks if an error has occurred. If an error has occurred, the host computer 20 retries or suspends the process.

In this embodiment having the aforesaid configuration, a pin of the interface connector 12 in the interface unit 11, which is defined as a Write Protect switch pin, may be used as a writing protection means that inhibits writing with the noncontact IC card 21 according to the voltage level of the pin. Alternatively, the host computer 20 may be designed to use a Card Eject detection pin to notify whether access to the noncontact IC card 21 is enabled. Moreover, a battery voltage sensing pin may be used to sense or monitor the voltage of a battery incorporated in the interface unit 11.

As mentioned above, according to this embodiment, the interface unit has the memory 14 whose storage capacity is as large as that of a known IC card, and the communication controller 15 connected the memory 14 and designed to control data communication with the noncontact IC card 21. The contents of the RAM 21c in the noncontact IC card 21 are read into the memory 14 in the interface unit 11. The host computer 20 then accesses the memory 14. The aforesaid various advantages of the noncontact IC card can be fully realized, while the large-capacity data memory in the noncontact IC card 21 can be accessed as quickly as a contact IC card is accessed. For writing data in the noncontact IC card 21, first, the host computer 20 writes the data in the memory 14 in the interface unit 11. Writing can therefore be achieved quickly. The data is then transferred to the noncontact IC card 21. After the ID code of the noncontact IC card has been checked, the data is written in the memory 21c in the noncontact IC card 21. Writing can therefore be achieved quickly, while writing into an incorrect card can be prevented.

Figure 23:
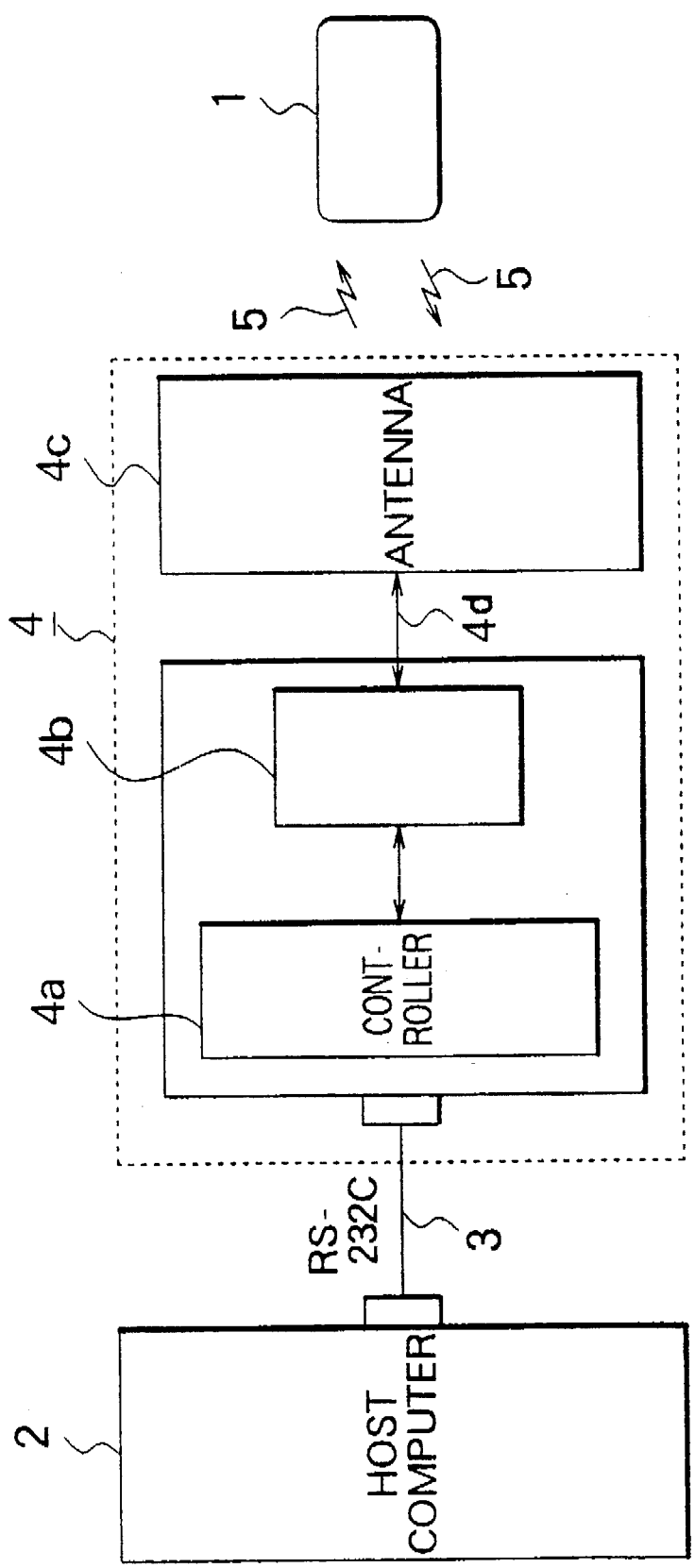
FIG. 23 is a block diagram showing the configuration of a communication system using a privately known but unpublished interface unit.

The host computer 20 and interface unit 11 are interconnected via the interface connector 12 without using a serial cable 3 (See FIG. 23), whereby signals can be transmitted in parallel with one another. The host computer 20 can therefore access the interface unit 11 more quickly.

Second Embodiment

In the first embodiment, the host computer 20 determines parameters required for accessing the noncontact IC card 21. If the parameters are fixed to certain values, setting of values can be omitted. A series of parameters may be programmed in the communication controller 15, so that, for example, when the host computer 20 is started up, the memory in the noncontact IC card 21 is read automatically, and that when the host-computer 20 is deenergized, the read ID code of the noncontact IC card 21 is compared with pre-set data and then data is written in the memory of the noncontact IC card 21. With this programming, once a pre-prepared noncontact IC card 21 is facing the antenna 11b and the communication system is started up, the contents of the memory in the noncontact IC card 21 are automatically read into the memory 14 in the interface unit 11. When the communication system is terminated, the contents of the memory 14 in the interface unit 11 are saved (written) in the noncontact IC card 21. A system for executing this sequence need not be installed in the host computer 20. Eventually, the host computer 20 need not take any action other than access to the memory 14.

For detecting that the communication system is started up, power-on reset may be executed or a CE terminal may be used. For detecting that the communication system is terminated, it may be determined whether the power supply is off or the CE terminal may be employed. Preferably, a battery or any other power supply may be incorporated in the body of the interface unit 11.

Third Embodiment

Figure 17:
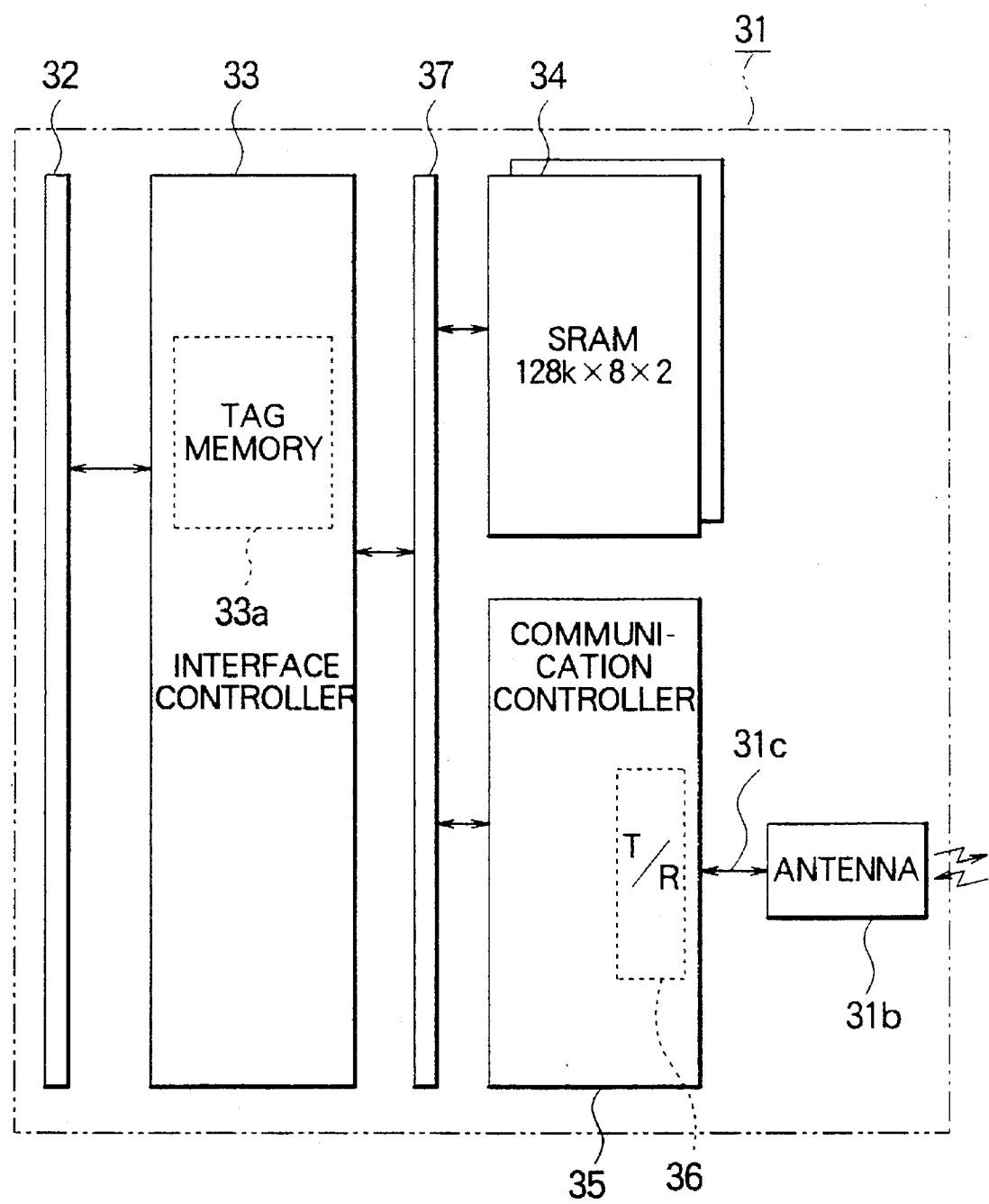
FIG. 17 is a block diagram showing the configuration of an interface unit in accordance with the third embodiment.

In the aforesaid embodiments, the storage capacity of the memory 14 in the interface unit 11 is equal to or larger than that of the memory in the noncontact IC card 21 concerned. In the third embodiment, the memory in a noncontact IC card concerned (not shown) has a larger storage capacity than a memory 34 in an interface unit 31. FIG. 17 is a block diagram showing the configuration of the interface unit 31 in this embodiment. The configuration is fundamentally identical to that of the interface unit 11 in the first embodiment shown in FIG. 5. The configuration of the interface unit 31 will therefore be described briefly. As illustrated, an interface controller 33 is electrically connected to an interface connector 32. In this embodiment, a tag memory 33a is incorporated in the interface controller 33. A memory 34 that is a cache SRAM or the like and a communication controller 35 are included. Similarly to the first embodiment, the memory 34, communication controller 35, and interface controller 33 are interconnected through an internal bus 37. In this embodiment, as illustrated in FIG. 17, a transmitter/receiver 36 is incorporated in the communication controller 35. It is understood that the transmitter/receiver 36 may be constructed as a stand alone unit. Similar to the first embodiment, an antenna 31b is linked with the transmitter/receiver 36 by way of an antenna cable 31c. Communication with the noncontact IC card is achieved via the antenna 31b.

Figure 18:
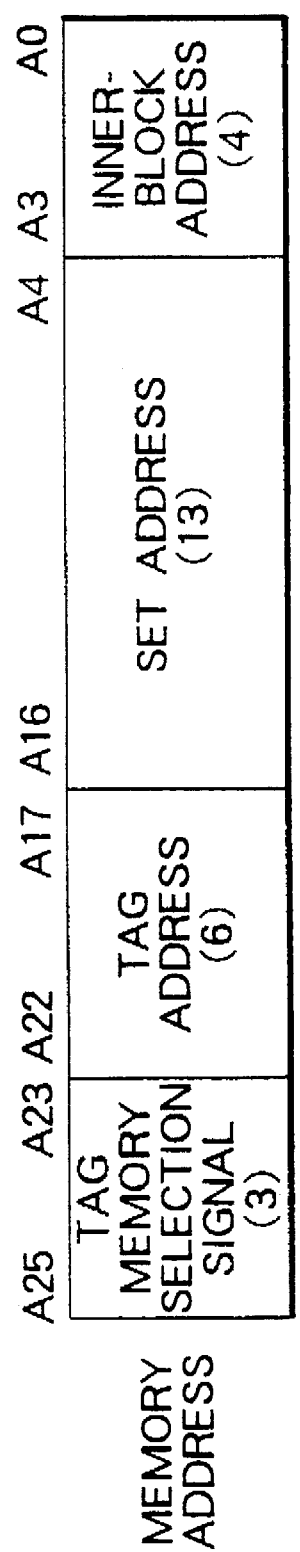
FIG. 18 shows an address format adopted for handling address signals associated with pins of an interface connector within the interface unit in accordance with the third embodiment.

FIG. 18 shows an example of an address format adopted for handling address signals associated with pins of the interface connector 32 within the interface unit 31. Address signals A0 to A25 in FIG. 18 are assigned to the pins of the interface connector 32 as shown in FIG. 3. These address signals are designated by the host computer 20 (See FIG. 4) and handled in the same manner as those when a known contact memory card or I/O card is employed. Address signals A0 to A25 designated by the host computer 20 are defined as indicated in the segments of a rectangle shown in FIG. 18. Accesses to the pins to which the address signals are assigned are controlled in line with the structures of the memory 34 (See FIG. 19) in the interface unit 31 and of the memory 41 (See FIG. 19) in a noncontact. IC card.

Figure 19:
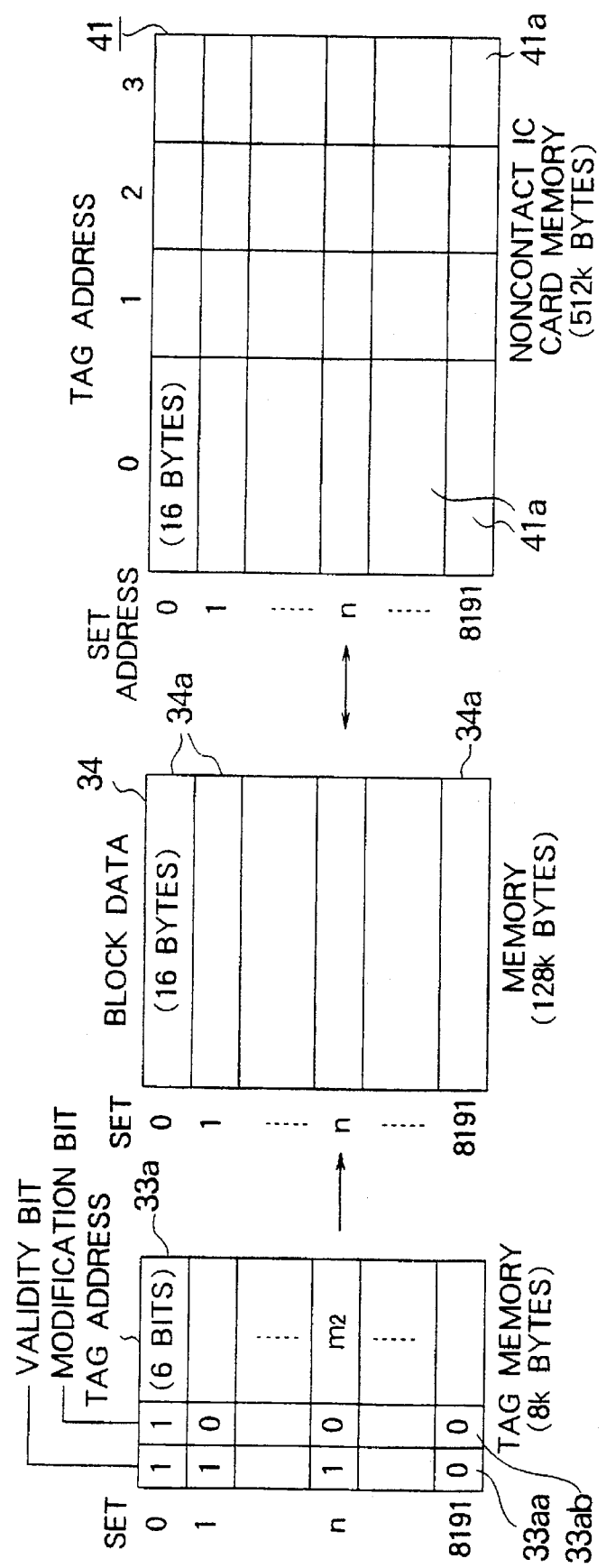
FIG. 19 shows the structures of memory spaces in the tag memory and memory in the interface unit and in the memory in the noncontact IC card in accordance with the third embodiment.

FIG. 18 will be described in conjunction with FIG. 19. FIG. 19 shows the structures of the memory spaces in a tag memory 33a and a memory 34 in the interface unit 31, and in the memory 41 in a noncontact IC card in that order from the left. As shown in the right part of FIG. 19, the memory 41 (with a capacity of 512K bytes) in a noncontact IC card is segmented into blocks, each of which has a length of 16 bytes and which are arranged in the form of a matrix of 8192 rows by 4 columns. Addresses indicating the rows are referred to as set addresses, and addresses indicating the columns are referred to as tag addresses. Each of the set addresses 0 to 8191 is composed of 13 bits. As shown in FIG. 18, 13 bits represented by address signals A16 to A4 sent from the host computer 20 are assigned to the set address. Each of the tag addresses 0 to 63 is composed of six bits. As shown in FIG. 18, six bits represented by address signals A22 to A17 sent from the host computer 20 are assigned to the tag address. In this embodiment, two low-order bits are used to represent the tag address ranging from 0 to 3. Four high-order bits are fixed to 0s. As shown in FIG. 18, an inner-block address to which four bits represented by address signals A3 to A0 are assigned corresponds to an offset address in a block data field in the memory 34 shown in the center part of FIG. 19. As shown in FIG. 18, a tag memory selection signal to which three bits represented by address signals A25 to A23 are assigned is used to select a tag memory from among a plurality of tag memories each having the structure shown in FIG. 19. The tag memory selection signal consists of-three-bits so as to represent any value in the range from 0 to 7. In this embodiment, only one tag memory is included. The tag memory selection signal therefore represents zero.

Next, actions will be described. The underlying concept of a so-called cache system is reflected on the actions. As shown in FIG. 19, the memory 34 in the interface unit 31 is composed of blocks 34a that number the same as (8192) set addresses each having a length of 16 bytes. The memory 41 in a noncontact IC card is divided into segments that number the same as the (8192) set addresses. The segments of the memory 41 are assigned set addresses 0 to 8191. Each of the segments is divided in units of 16 bytes corresponding to the length of each of the blocks 34a and thus divided into blocks 41a each having a length of 16 bytes. The blocks 41a are assigned tag addresses 0 to 3. The thus-seg-mented memory 41 in a noncontact IC card is accessible block 41a by block 41a so that the data in the memory 41 is stored in the memory 34 in the interface unit 31. The addresses of the blocks 41a in the memory 41 in a noncontact IC card, in which data is stored in the memory 34 in the interface unit 31, are stored in the tag memory 33a incorporated in the interface controller 33. Address management is achieved on the basis of the set addresses and the associated contents of the tag memory 33a. When a validity bit 33aa of the tag memory 33a in FIG. 19 represents a "1", the contents of a block 41a in the memory 41 in a noncontact IC card have been read into a block 34a at a corresponding set address in the memory 34, and the tag address of the block 41a is set in the tag memory 33a. A modification bit 33ab represents a 1 so as to indicate that the contents of an associated block 34a has been modified.

When accessing data in the memory 41 in a noncontact IC card, the host computer 20 (See FIG. 4) gives address signals A0 to A25 to the interface unit 31 via the interface connector 32. The interface controller 33 (FIG. 17) in the interface unit 31 uses address signals A0 to A25 to produce, as shown in FIG. 18, the tag memory selection signal, the tag address signal, the set address signal, and the inner-block address signal, and then controls succeeding process. First, the interface controller 33 reads a validity bit, a modification bit, and a tag address from a set address represented by the produced set address signal in a tag memory 33 selected according to the tag memory selection signal (in this embodiment, since there is only one tag memory, no selection is made).

At this time, when the validity bit 33aa represents a "0", the communication controller 35 is instructed to store the contents of a block 41a in the memory 41 in a noncontact IC card, which is defined with the data represented by the produced tag address signal and set address signal, in a block 34a at the corresponding set address in the memory 34 in the interface unit 31. After completing transfer of data from the memory 41 in a noncontact IC card, the interface controller 33 takes action to access (read or write) the data stored in the block 34a in the memory 34. When the validity bit 33aa represents a "1", the tag address represented by the tag address signal made from address signals A22 to A17 is compared with the tag address read from the tag memory 33a. If the tag addresses agree with each other, the contents of the associated block 34a are accessed (read or written). If the tag addresses disagree with each other, first, the modification bit 33ab is checked. When the modification bit 33ab represents a "1", the interface communication controller 35 is instructed to store the contents of the block 34a existent at the corresponding set address in the memory 34 into a block 41a having the corresponding set address and tag address in the memory 41 in a noncontact IC card. After the data has been stored, the communication controller 35 is instructed to read the contents of the block 41a existent at the set address and tag address derived from the address signals and store the contents of the block 41a in the block 34a at the corresponding set address in the memory 34. After data has been transferred to the block 34a, the interface controller 33 takes action to access (read or write) the contents of the block 41a stored in the block 34a in the memory 34. According to this embodiment, large-capacity noncontact IC cards can be dealt with and accessed relatively quickly.

Fourth Embodiment

Figure 20A:
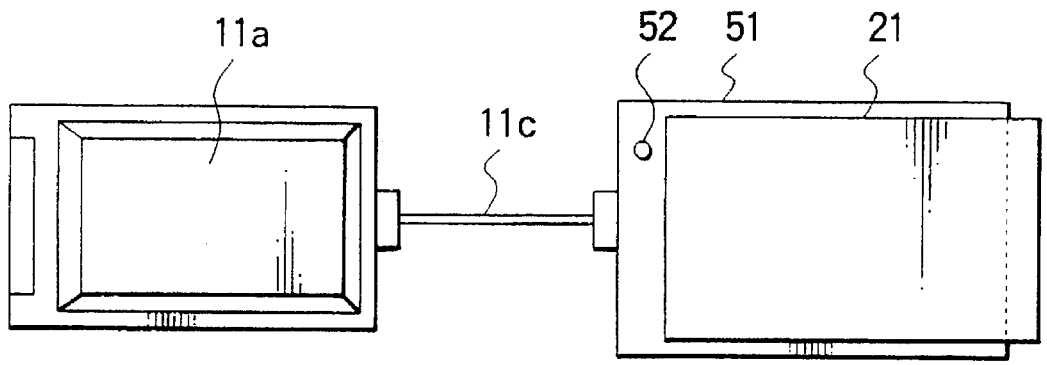
FIGS. 20A is a top view showing an interface unit in accordance with the fourth embodiment.
Figure 20B:
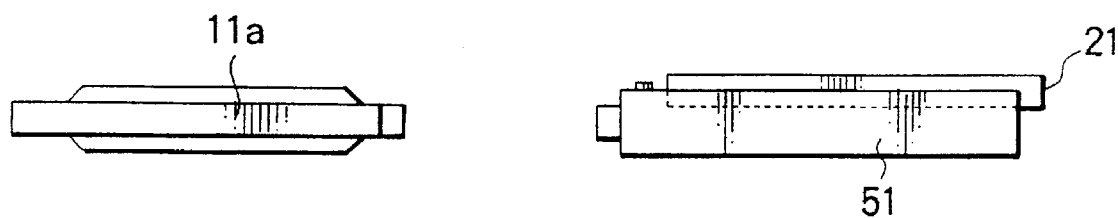
FIGS. 20B is a side view showing an interface unit in accordance with the fourth embodiment.
Figure 20C:
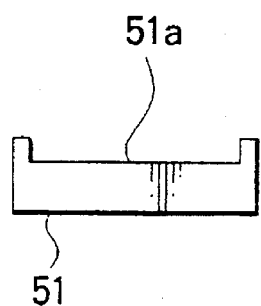
FIGS. 20C is another side view showing an interface unit in accordance with the fourth embodiment.

In the first embodiment, the interface unit 11 has the antenna 11b installed in a different place. The interface unit 11 and antenna 11b are linked each other by way of the cable 11c. As shown in FIGS. 20A to 20C, an antenna may be attached to the noncontact IC card 21 and thus integrated into the noncontact IC card 21. FIG. 20A is a top view showing an interface unit in accordance with this embodiment with the noncontact IC card 21 mounted. FIG. 20B is a side view showing the interface unit but with the cable 11c omitted. FIG. 20C is another side view showing the interface unit in the opposite direction of the antenna. FIG. 20D shows the relationship between these figures. In this embodiment, similar to the first embodiment, an antenna 51 is linked with the body 11a by way of the antenna cable 11c. A difference lies in that a recess 51a serving as a noncontact IC card loader in which the noncontact IC card 21 is locked is located in the antenna 51. Reference numeral 52 denotes an access lamp indicating whether a noncontact IC card is being accessed. Thus, the noncontact IC card 21 is locked in the antenna 51. This structure enables more stable communication with the noncontact IC card 21, thus improving communication reliability.

Fifth Embodiment

This embodiment is a variant of the fourth embodiment. FIGS. 21A and 21B are top and side views showing an interface unit in accordance with this embodiment. In this embodiment, an antenna cable is not used to link an antenna but an antenna 51A is integrated into the body 11a. Furthermore, the antenna 51A is structured so that it can pivot relative to the body 11a with a junction 53 as an axis. The angle of the antenna 51A can therefore be determined freely. As shown in FIG. 21, the antenna 51A may be laid flat and the noncontact IC card 21 may be placed on the antenna 51A. Alternatively, the antenna 51A may be raised vertically. In this embodiment, similar to the fourth embodiment, a recess in which the noncontact IC card 21 is mounted in located in the antenna 51A. A slot (not shown) in which the noncontact IC card 21 is locked may be a noncontact IC card loader in the antenna 57, and a noncontact IC card may be inserted in the slot. This embodiment achieves the same advantages as the fourth embodiment.

In the aforesaid fourth or fifth embodiment, a lock in (not shown) may be rested on the surface of the antenna 51 or 51A as a means for locking the noncontact IC card 21, so that the noncontact IC card 21 is securely held by the pin. Alternatively, a magnetic substance (not shown) ma be embedded at each of four corners of the noncontact IC card 21, and electromagnets (not shown) may be embedded at the corresponding positions of the antenna 51 or 51A at which the magnetic substances of the noncontact IC card 21 are located. When the noncontact IC card 21 is being accessed, the electromagnets are energized to hold the noncontact IC card.

Sixth Embodiment

In this embodiment, an antenna (not shown) is stowed in the body 11a of an interface unit. FIGS. 22A and 22B are top and side views showing this embodiment. In this embodiment, the body 11a of an interface unit is inserted in an IC card slot 20a of the host computer 20, and the noncontact IC card 21 is locked on the outer surface of the IC card slot 20a of the host computer 20 above the body 11a of an interface unit. The housings of the host computer 20 and IC card slot 20a are made of a nonmetallic material through which electromagnetic waves can pass, so that an antenna (not shown) incorporated in the interface unit can transmit and receive electromagnetic-wave signals. This embodiment achieves the same advantage as the aforesaid fourth and fifth embodiments.

Seventh Embodiment

In the aforesaid embodiments, an interface unit of the present invention is used for communication between a host computer and a noncontact IC card. This embodiment is concerned with communication between two interface units. Specifically, two host computers 20 (See FIG. 4) and the antennas 11b of two interface units 11 (See FIG. 4) mounted in the host computers are located at positions permitting communication. One of the interface units 11 transfers the contents of the memory 14 (See FIG. 5) in the other interface unit 11 to its own memory 14. Thus, each of the two host computers 20 can readily access the memory 14 in the interface connected to the mate host computer as quickly as it accesses a know contact IC card.

In the noncontact IC card interface unit and communication system which are configured as mentioned above according to the first and sixth aspects of the present invention, the noncontact IC card interface unit comprises an interface controller for controlling a bidirectional signal relative to an external host computer, a communication controller for controlling data communication with an noncontact IC card according to an output signal sent from the external host computer, and a memory whose data can be accessed by the interface controller and communication controller. For reading data from a noncontact IC card, the communication controller transfers data from the noncontact IC card to the memory according to an output signal sent from the host computer. The host computer then accesses the data transferred to the memory via the interface controller. For writing data in a noncontact IC card, the host computer quickly writes data in the memory via the interface controller. The communication controller then transfers the data written in the memory to the noncontact IC card and writes it in the noncontact IC card. Writing can therefore be achieved quickly. It is unnecessary to attach or detach an interface connector to or from a slot or the like. There is no problem such as mechanical damage.

According to the second, ninth, and eleventh aspects of the present invention, a normal mode in which the memory in a noncontact IC card is accessed is changed to a charge mode in which a secondary battery in the noncontact IC card is charged, or vice versa. Therefore, a noncontact IC card is not activated accidentally during charging.

According to the third, tenth, and twelfth aspects of the present invention, the frequency of electromagnetic waves is changed between charging and normal operation in a noncontact IC card interface unit or in a noncontact IC card. A noncontact IC card can therefore be charged efficiently. Moreover, the noncontact IC card is not activated accidentally during charging.

According to the thirteenth aspect of the present invention, a cutoff means for cutting off an activation signal intended to activate a noncontact IC card is included in a noncontact IC card. Therefore, a noncontact IC card is not activated during charging.

According to the fourth aspect of the present invention, a noncontact IC card interface unit can be mounted in a host connector (IC card slot) that is designed for a known contact IC card and formed in an external host compute. Moreover, driver software an other application software designed for a contact IC card can be run.

According to the fifth aspect of the present invention, a noncontact IC card is locked in an electromagnetic-wave signal communicating means for transmitting and receiving a bidirectional electromagnetic-wave signal relative to the noncontact IC card. This structure enables more stable communication with a noncontact IC card. Eventually, communication reliability improves.

According to the sixth aspect of the present invention, an antenna can pivot freely relative to a body of an interface unit. The angle of the antenna can be determined freely.

According to the seventh and fourteenth aspects of the present invention, a noncontact IC card interface unit is configured as an integrated unit and can therefore be designed compactly. The noncontact IC card interface unit is inserted in a host connector, and a noncontact IC card is locked on the outer surface of the host connector of the host computer. This results in stable communication.

According to the fifteenth aspect of the present invention, the memory in a noncontact IC card interface unit or in a noncontact IC card is segmented into blocks each having a certain length in bytes. The contents of the memory are transferred block by block. A tag memory is used to manage addresses of blocks whose data has been transferred. Large-capacity noncontact IC cards can therefore be dealt with and accessed quickly.

What is claimed is:

1. A noncontact IC card interface unit for communicating between an external host computer and a noncontact IC card comprising:

a connector for connecting an interface unit to an external host computer;

first control means electrically connected to said connector for controlling a bidirectional signal relative to said external host computer;

second control means electrically connected to said first control means and receiving an output signal from said external host computer through said first control means for controlling data communication with a noncontact IC card in response to the output signal;

electromagnetic-wave signal communicating means electrically connected to said second control means for transmitting and receiving a bidirectional electromagnetic-wave signal relative to the noncontact IC card;

a bus to which said first control means and said second control means are connected; and a memory electrically connected to and accessible through said bus by said first control means and said second control means.

2. The noncontact IC card interface unit according to claim 1, comprising mode selector means for changing between a normal mode in which the noncontact IC card is accessed through said electromagnetic-wave signal communicating means and a charge mode in which a secondary battery incorporated in the noncontact IC card is charged through said electromagnetic-wave signal communicating means.

3. The noncontact IC card interface unit according to claim 2 wherein said mode selector means includes frequency changer means for changing an electromagnetic-wave signal frequency transmitted from said electromagnetic-wave signal communicating means to the noncontact IC card between a first frequency for the normal mode and a second frequency for the charge mode.

4. The noncontact IC card interface unit according to claim 1 wherein said electromagnetic-wave signal communicating means has a housing and a noncontact IC card mounting portion in which a noncontact IC card may be mounted is located in said housing.

5. The noncontact IC card interface unit according to claim 4 wherein:
   said noncontact IC card interface unit comprises;
   a body containing said connector, said first control means, said second control means, and said memory; and
   an antenna including said electromagnetic-wave signal communicating means wherein said antenna is integrated into and pivotable with respect to said body.

6. The noncontact IC card interface unit according to claim 1 wherein said noncontact IC card interface unit has a housing in which said connector, said first control means, said second control means, said memory, and said electromagnetic-wave signal communicating means are located.

7. A communication system for communicating between a host computer and a noncontact IC card comprising:
   a noncontact IC card having a memory;
   a host computer for providing an output signal for accessing said memory in said noncontact IC card; and
   a noncontact IC card interface unit for receiving the output signal from said host computer for enabling data communication between said host computer and said noncontact IC card, said noncontact IC card interface unit including:
      a connector for connecting an interface unit to an host computer;
      first control means electrically connected to said connector for controlling a bidirectional signal relative to said host computer;
      second control means electrically connected to said first control means and receiving the output signal from said host computer through said first control means for controlling data communication with said noncontact IC card according to the output signal;
      electromagnetic-wave signal communicating means electrically connected to said second control means for transmitting and receiving a bidirectional electromagnetic-wave signal relative to said noncontact IC card;
      a bus to which said first control means and said second control means are connected; and
      a memory electrically connected to and accessible through said bus by said first control means and said second control means.

8. The communication system according to claim 7 wherein said noncontact IC card interface unit includes interface mode selector means for changing between a normal mode in which said memory in said noncontact IC card is accessed through said electromagnetic-wave signal communicating means and a charge mode in which a secondary battery incorporated in said noncontact IC card is charged through said electromagnetic-wave signal communicating means.

9. The communication system according to claim 8 wherein said interface mode selector means in said noncontact IC card interface unit includes frequency changer means for changing an electromagnetic-wave signal frequency transmitted from said electromagnetic-wave signal communicating means to said noncontact IC card between a first frequency for the normal mode and a second frequency for the charge mode.

10. The communication system according to claim 7 wherein said noncontact IC card interface unit has card mode changer means for changing between a normal mode in which said noncontact IC card is accessed by said noncontact IC card interface unit and a charge mode in which a secondary battery incorporated in said noncontact IC card is charged.

11. The communication system according to claim 10 wherein said card mode changer means in said noncontact IC card includes frequency changer means for changing the frequency of the electromagnetic-wave signal received from said electromagnetic-wave signal communicating means in said interface unit between the normal mode and the charge mode.

12. The communication system according to claim 10 wherein said card mode changer means in said noncontact IC card includes cutoff means for cutting off an activation signal for activating said noncontact IC card and sent from said host computer through said noncontact IC card interface unit when said noncontact IC card is in the charge mode.

13. The communication system according to claims 7 wherein:
   said noncontact IC card interface unit includes a housing in which said connector, said first control means, said second control means, said memory, and said electromagnetic-wave signal communicating means are located;
   said host computer has a host connector, said host connector including an interface unit mounting portion in which said housing of said noncontact IC card interface unit is mounted, and a noncontact IC card mounting portion in which said noncontact IC card may be mounted so that said noncontact IC card is substantially parallel to said interface unit.

14. The communication system according to claim 7 wherein:
   said memory in said noncontact IC card interface unit is segmented into a plurality of blocks, each block having a predetermined length in bytes;
   said memory in said noncontact IC card has a larger storage capacity than said memory in said noncontact IC card interface unit and is segmented into a plurality of blocks each block having the same length in bytes as each of said blocks constituting said memory in said noncontact IC card interface unit;
   data transfer is performed block by block between said memory in said noncontact IC card interface unit and said memory in said noncontact IC card; and
   said noncontact IC card interface unit has a tag memory for storing addresses of blocks transferred from said memory of said noncontact IC card to said memory in said noncontact IC card interface unit.

15. The noncontact IC card according to claim 1 wherein said second control means comprises:
   a microprocessor for controlling the operation of said second control means;
   a ROM for storing instructions and data used by said microprocessor;
   a register for receiving the output signal from said first control means;
   an input/output circuit for transmitting data to said electromagnetic-wave signal communicating means and for receiving data from said electromagnetic-wave signal communicating means;
   a buffer memory for storing data received from said first control means, for storing data received from said electromagnetic-wave signal communicating means, and for storing data and instructions for said microprocessor; and a controller bus electrically interconnecting said microprocessor, said ROM, said register, said input/output circuit, and said buffer memory.

16. The noncontact IC card according to claim 7 wherein said second control means comprises:

a microprocessor for controlling the operation of said second control means;

a ROM for storing instructions and data used by said microprocessor;

a register for receiving the output signal from said first control means;

an input/output circuit for transmitting data to said electromagnetic-wave signal communicating means and for receiving data from said electromagnetic-wave signal communicating means;

a buffer memory for storing data received from said first control means, for storing data received from said electromagnetic-wave signal communicating means, and for storing data and instructions for said microprocessor; and a controller bus electrically interconnecting said microprocessor, said ROM, said register, said input/output circuit, and said buffer memory.

* * * * *